(12) United States Patent
Matsumura et al.

(10) Patent No.: US 11,350,392 B2
(45) Date of Patent: May 31, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/479,329

(22) PCT Filed: Jan. 19, 2018

(86) PCT No.: PCT/JP2018/001509
§ 371 (c)(1),
(2) Date: Jul. 19, 2019

(87) PCT Pub. No.: WO2018/135608
PCT Pub. Date: Jul. 26, 2018

(65) Prior Publication Data
US 2019/0342877 A1  Nov. 7, 2019

(30) Foreign Application Priority Data
Jan. 20, 2017  (JP) .............................. JP2017-008949

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0051* (2013.01); *H04L 25/0226* (2013.01); *H04W 72/0446* (2013.01); *H04W 72/1268* (2013.01)

(58) Field of Classification Search
CPC ......... H04W 72/0413; H04W 72/0446; H04W 72/1268; H04W 72/04; H04L 5/0051; H04L 25/0226
See application file for complete search history.

(56) References Cited

U.S. PATENT DOCUMENTS

2012/0127961 A1* 5/2012 Kawamura ........... H04W 24/10
370/335
2012/0250523 A1* 10/2012 Miki ..................... H04L 1/1861
370/242

(Continued)

OTHER PUBLICATIONS

International Search Report issued in PCT/JP2018/001509 dated Apr. 3, 2018 (2 pages).

(Continued)

*Primary Examiner* — Dady Chery
(74) *Attorney, Agent, or Firm* — Osha Bergman Watanabe & Burton LLP

(57) ABSTRACT

The present invention is designed so as to be able to preferably control the degradation of spectral efficiency even when communication is performed using a plurality of uplink control channel formats carrying different numbers of symbols. A user terminal according to one aspect of the present invention has a transmission section that transmits uplink control information using at least one of a plurality of uplink control channel structures carrying different numbers of symbols, and a control section that exerts control so that, regardless of which of the plurality of uplink control channel structures is used, a reference signal is mapped to a same time resource.

12 Claims, 30 Drawing Sheets

(51) Int. Cl.
*H04L 25/02* (2006.01)
*H04W 72/12* (2009.01)

(56) References Cited

U.S. PATENT DOCUMENTS

| 2013/0010723 | A1* | 1/2013 | Ouchi | H04W 52/346 |
| | | | | 370/329 |
| 2013/0114501 | A1* | 5/2013 | Kishiyama | H04J 13/0059 |
| | | | | 370/328 |
| 2018/0077700 | A1* | 3/2018 | Nakashima | H04L 5/0055 |
| 2018/0270011 | A1* | 9/2018 | Yang | H04L 27/26 |

OTHER PUBLICATIONS

Written Opinion of the International Searching Authority issued in PCT/JP2018/001509 dated Apr. 3, 2018 (4 pages).

NTT DOCOMO, Inc.; "UL aspects of TTI shortening"; 3GPP TSG RAN WG1 Meeting #84, R1-160965; St Julians's, Malta; Feb. 15-19, 2016 (8 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 NR Ad-Hoc Meeting; R1-1700504 "Design of short duration NR-PUCCH format" LG Electronics; Spokane, USA; Jan. 16-20, 2017 (6 pages).

3GPP TSG RAN WG1 AH_NR Meeting; R1-1700618 "Summary of [87-32]: UL L1/L2 control channel design for NR" NTT DOCOMO, Inc.; Spokane, USA; Jan. 16-20, 2017 (30 pages).

3GPP TSG RAN WG1 Nr Ad-Hoc Meeting; R1-1700951 "UL Control Channel Design: Long Format" Samsung; Spokane, USA; Jan. 16-20, 2017 (3 pages).

Extended European Search Report issued in European Application No. 18741153.3, dated Sep. 29, 2020 (8 pages).

* cited by examiner

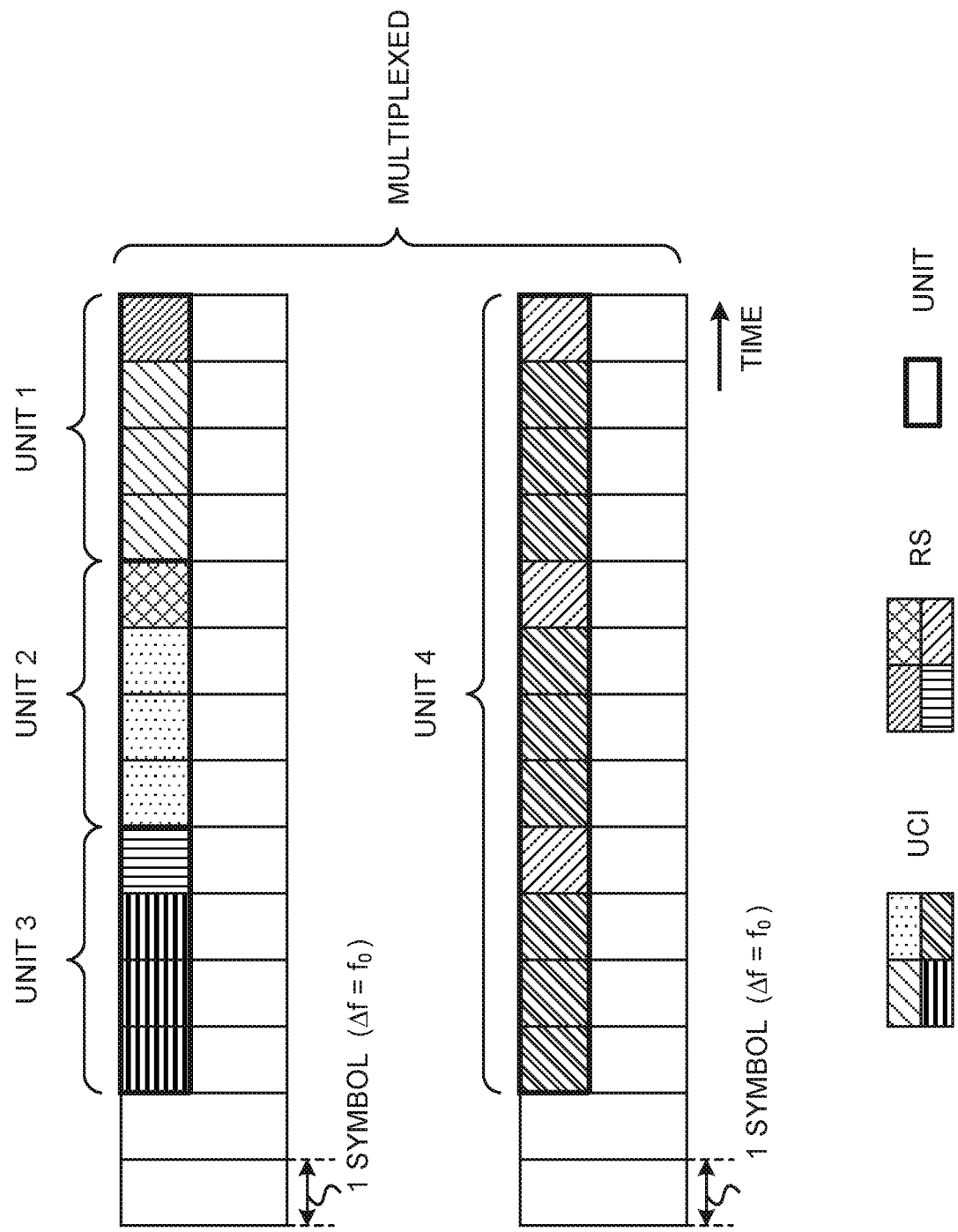

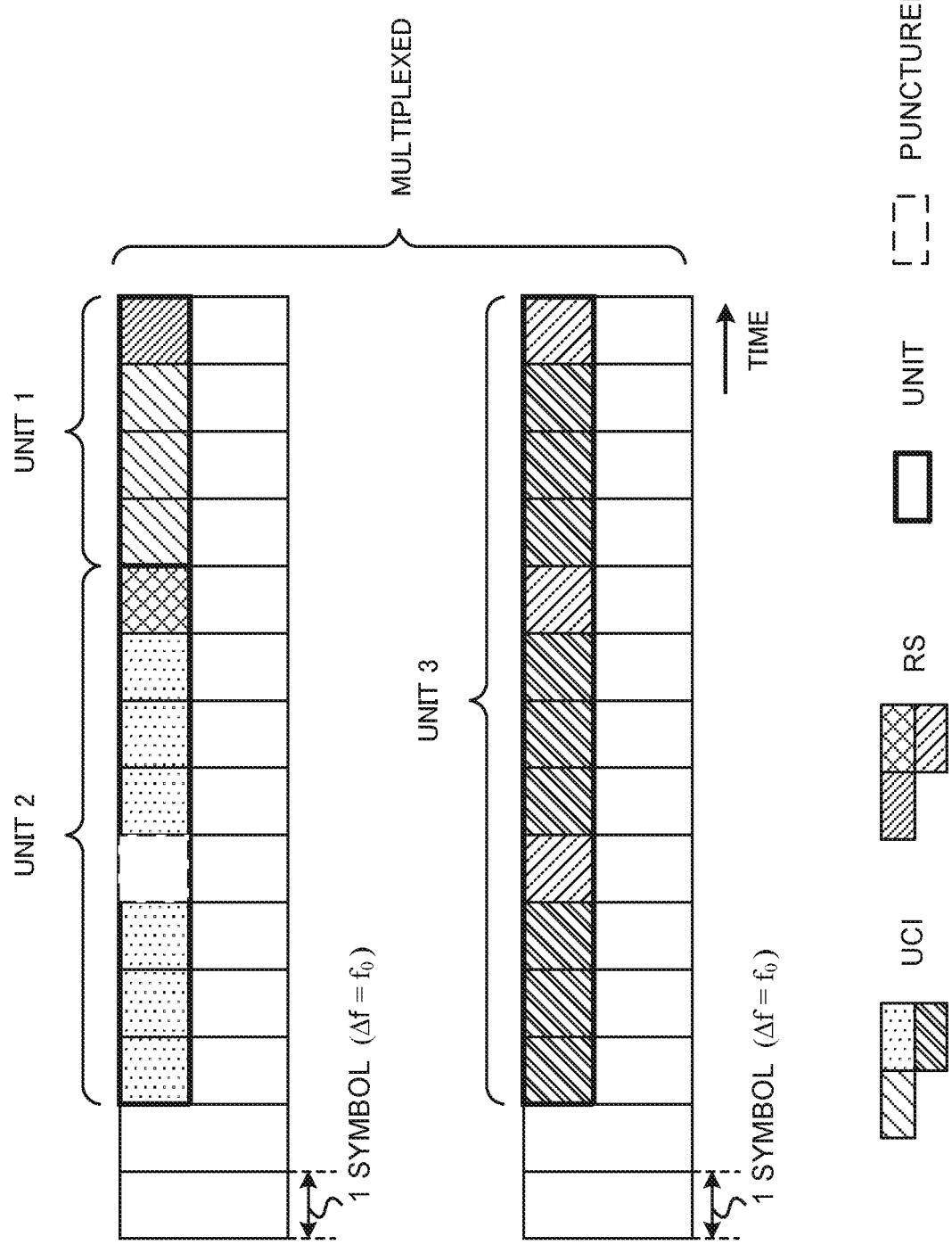

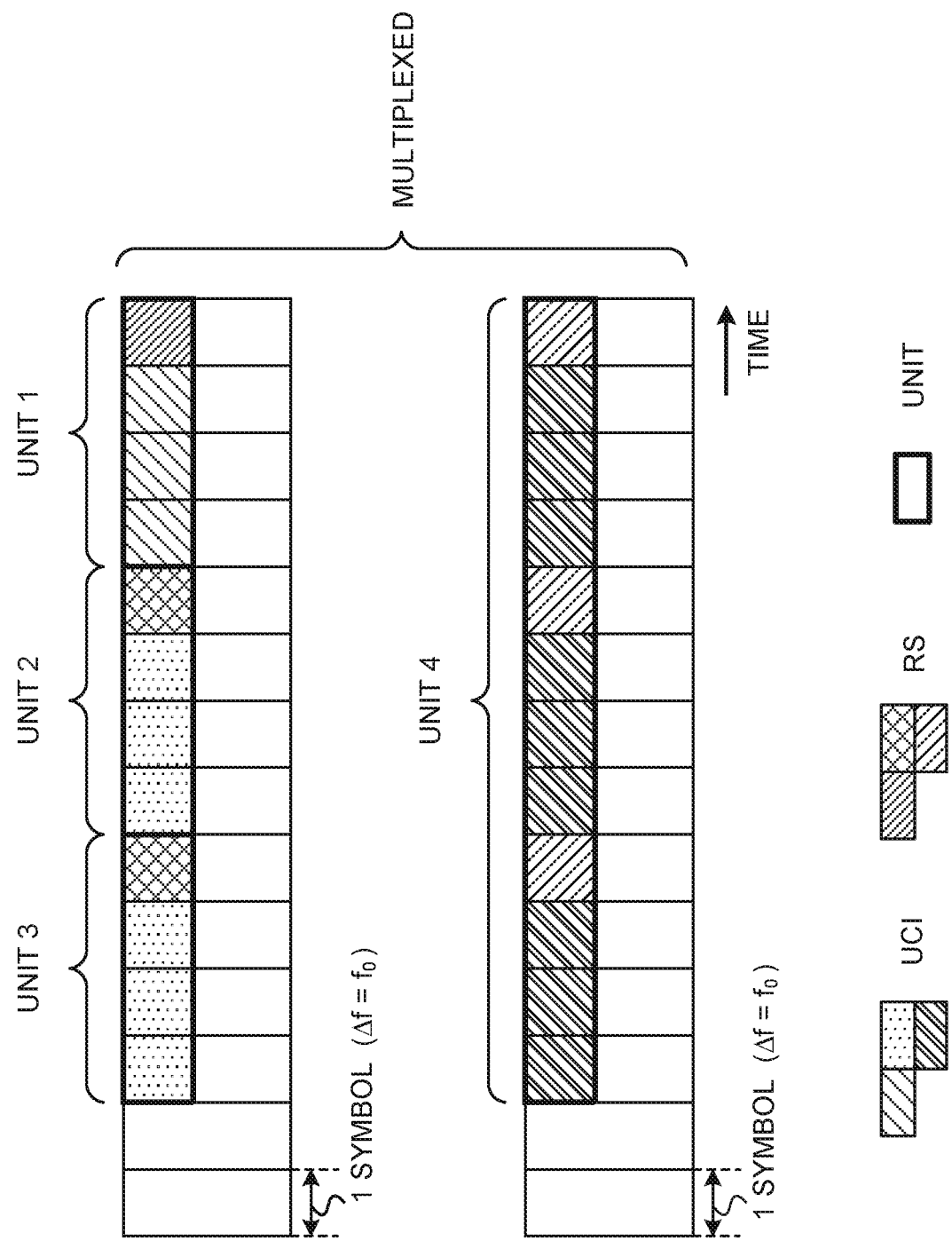

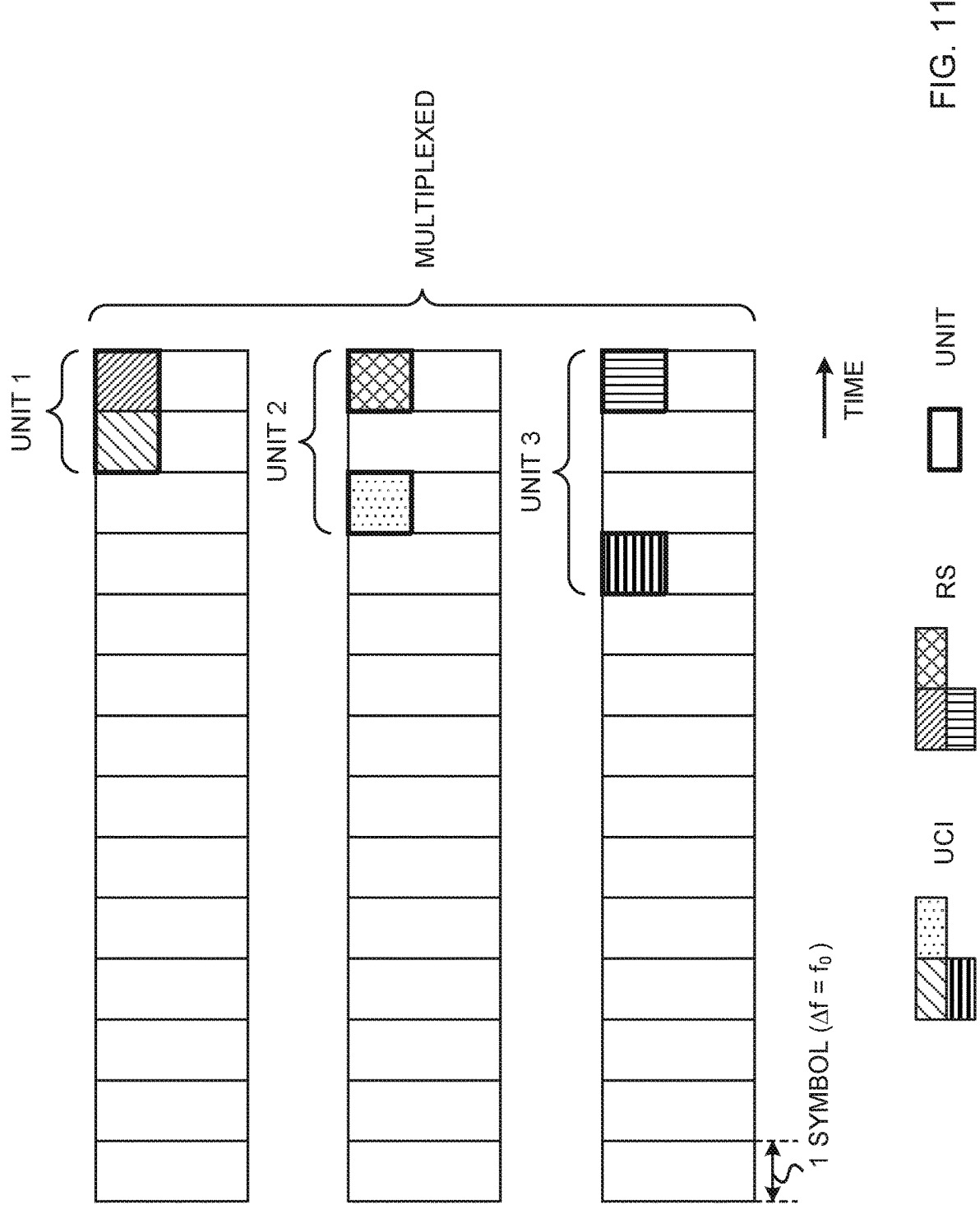

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

Also, in existing LTE systems (for example, LTE Rel. 8 to 13), a user terminal (UE: User Equipment) transmits uplink control information (UCI) by using a UL control channel (for example, PUCCH: Physical Uplink Control CHannel) and/or a UL data channel (for example, PUSCH: Physical Uplink Shared CHannel). The format of these UL controls channel is referred to as "PUCCH format" and so on.

UCI includes at least one of a scheduling request (SR), retransmission control information in response to DL data (DL data channel (PDSCH: Physical Downlink Shared CHannel)) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)." April, 2010

SUMMARY OF INVENTION

Technical Problem

Future radio communication systems (for example, 5G, NR, etc.) are expected to realize various radio communication services so as to fulfill mutually varying requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Meanwhile, a study is in progress to use uplink control channels (uplink control channel formats) carrying different numbers of symbols in LTE/NR. However, in this case, if a simple mapping method is applied to uplink control information symbols and reference signal symbols in the uplink control channels, the problem arises that uplink control information cannot be efficiently transmitted. In this case, communication throughput, spectral efficiency, and so on deteriorate.

The present invention has been made in view of the above, and it is therefore an object of the present invention to provide a user terminal and a radio communication method that can adequately control the degradation of spectral efficiency even when communications is performed using a plurality of uplink control channel structures carrying different numbers of symbols.

Solution to Problem

A user terminal according to one aspect of the present invention has a transmission section that transmits uplink control information using at least one of a plurality of uplink control channel structures carrying different numbers of symbols, and a control section that exerts control so that, regardless of which of the plurality of uplink control channel structures is used, a reference signal is mapped to a same time resource.

Advantageous Effects of Invention

According to the present invention, even when communications is performed using a plurality of uplink control channel formats carrying different numbers of symbols, it is possible to control the degradation of spectral efficiency adequately.

BRIEF DESCRIPTION OF DRAWINGS

FIG. 8 is a diagram to show an example of multiplexing a PUCCH in which the number of PUCCH symbols is X or more;

FIG. 9 is a diagram to show another example of multiplexing a PUCCH in which the number of PUCCH symbols is X or more;

FIG. 10 is a diagram to show yet another example of multiplexing a PUCCH in which the number of PUCCH symbols is X or more;

FIG. 11 is a diagram to show an example of multiplexing a PUCCH in which the number of PUCCH symbols is less than X;

DESCRIPTION OF EMBODIMENTS

Figure 1A:
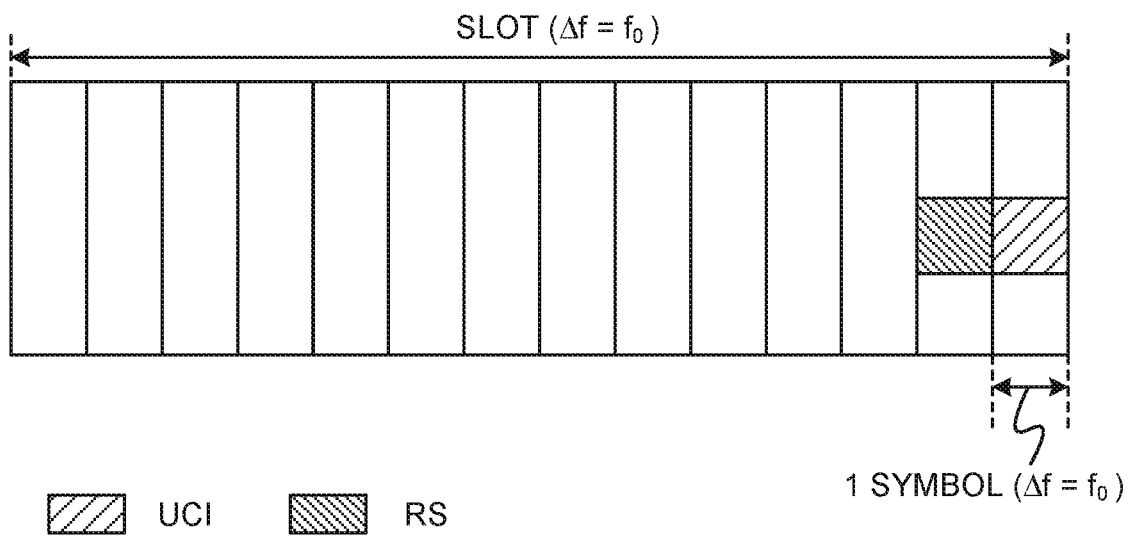
FIG. 1A and FIG. 1B are diagrams, each showing an example of a short PUCCH format in future radio communication systems.

Future radio communication systems (for example, LTE Rel. 14, 15 and/or later versions, 5G, NR, etc.) are under study to introduce multiple numerologies, not a single numerology.

Note that numerology may refer to a set of communication parameters that characterize the design of signals in a given RAT (Radio Access Technology), the design of the RAT and so on, or may be parameters that relate to the frequency direction and/or the time direction, such as subcarrier spacing (SCS), symbol duration, cyclic prefix duration, subframe duration and so on. For example, future radio communication systems may support multiple SCS spacings such as 15 kHz, 30 kHz, 60 kHz, 120 kHz and 240 kHz.

Also, future radio communication systems are being studied to introduce time units (also referred to as "subframes," "slots," "minislots," "subslots," "transmission time intervals (TTIs)," "short TTIs," "radio frames" and so on) that are the same and/or different than existing LTE systems (LTE Rel. 13 or earlier versions), while supporting multiple numerologies and so on.

Note that the TTI may represent the unit of time in transmitting and receiving transport blocks, code blocks and/or codewords of transmitting/receiving data. When a TTI is provided, the period of time (for example, the number of symbols) in which transport blocks, code blocks and/or codewords are actually mapped may be shorter than the TTI.

For example, when a TTI is formed with a predetermined number of symbols (for example, fourteen symbols), transport blocks, code blocks and/or codewords of transmitting/receiving data can be transmitted and received in one or a predetermined number of symbol periods. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as a time unit having a predetermined time duration (for example, 1 ms), irrespective of which numerology is used by (and/or configured in) the user terminal (for example, UE (User Equipment)).

On the other hand, slots may serve as a time unit that is based on the numerology used by the UE. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than the PUCCH (Physical Uplink Control CHannel) formats of existing LTE systems (for example, LTE Rel. 8 to 13) and/or a UL control channel (hereinafter also referred to as a "long PUCCH") that is structured to have a longer duration than the above short duration.

A short PUCCH (also referred to as a "shortened PUCCH") is formed with a predetermined number of symbols (for example, one symbol or two symbols) of a given SCS. In this short PUCCH, uplink control information (UCI) and a reference signal (RS) may be time-division-multiplexed (TDM: Time Division Multiplexing) or frequency-division-multiplexed (FDM: Frequency Division Multiplexing). The RS may be, for example, the demodulation reference signal (DMRS: DeModulation Reference Signal), which is used to demodulate UCI.

The SCS in each symbol of the short PUCCH may be the same as or higher than the SCS in symbols for data channels (hereinafter also referred to as "data symbols"). The data channels may be, for example, a downlink data channel (PDSCH: Physical Downlink Shared CHannel), an uplink data channel (PUSCH: Physical Uplink Shared CHannel) and so on.

A short PUCCH may be referred to as a "PUCCH with a higher (bigger, wider, etc.) SCS" (for example, 60 kHz). Note that the time unit in which one short PUCCH is transmitted may be referred to as a "short TTI."

In a short PUCCH, a multicarrier waveform (for example, a waveform based on cyclic prefix OFDM (CP-OFDM: Cyclic Prefix Orthogonal Frequency Division Multiplexing)) may be used, or a single-carrier waveform (for example, a waveform based on DFT-S-OFDM (Discrete Fourier Transform Spread Orthogonal Frequency Division Multiplexing) may be used.

Note that the waveform may be referred to as "communication scheme," "multiplexing scheme," "modulation scheme," "access scheme," "waveform scheme," and so on. Also, these waveforms may be characterized based on whether or not DFT precoding (spreading) is applied to the OFDM waveform. For example, CP-OFDM may be referred to as the "waveform (signal) to which DFT precoding is not applied," and DFT-S-OFDM may be referred to as the "waveform (signal) to which DFT precoding is applied." Furthermore, a "waveform" may also be referred to as "waveform signal," "signal in accordance with waveform," "waveform of signal," "signal," and so on.

Figure 1B:
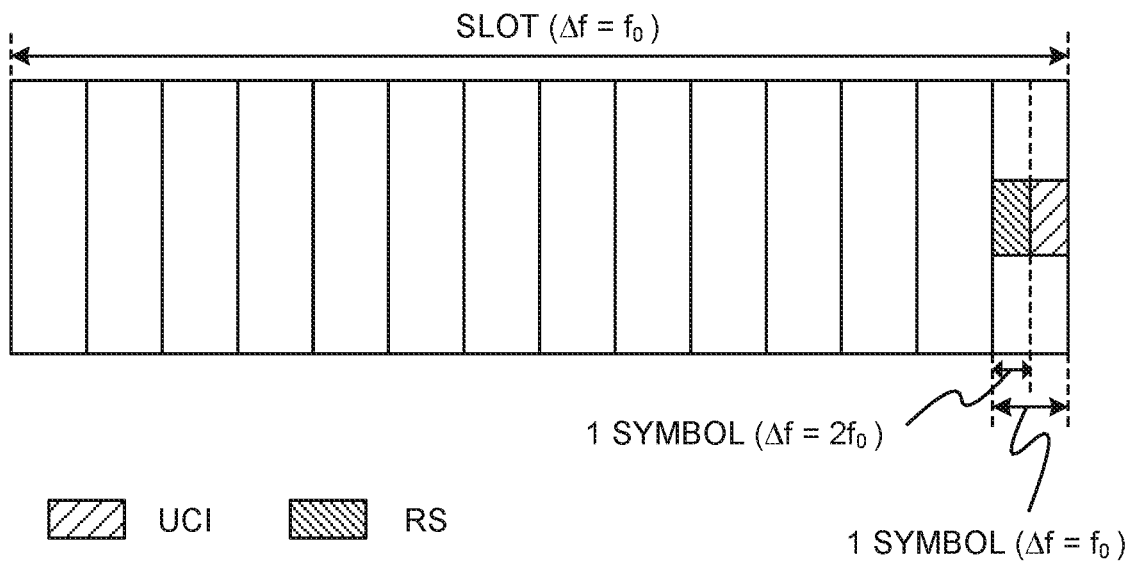

FIGS. 1A and 1B are diagrams, each showing an example of a short PUCCH format for future radio communication systems. In these examples, one slot is formed with fourteen symbols, each having a subcarrier spacing of $\Delta f = f_0$ (for example, 15 kHz), but the number of symbols to be included in one slot is by no means limited to this.

In FIG. 1A and FIG. 1B, a short PUCCH is placed (mapped) in a predetermined number of symbols (here, one symbol or two symbols) from the end of the slot. In addition, the short PUCCH is placed in one or more frequency resources (for example, one or more physical resource blocks (PRBs)).

As shown in FIG. 1A, in a short PUCCH, UCI and RS may be time-division-multiplexed (TDM) in a plurality of symbols. In this short PUCCH, the UCI and the RS are arranged in different symbols. A multicarrier waveform (for example, the OFDM waveform) or a single-carrier waveform (for example, the DFT-s-OFDM waveform) can be applied to this short PUCCH.

Meanwhile, as shown in FIG. 1B, in a short PUCCH, UCI and an RS may be time-division-multiplexed (TDM) over a plurality of symbols having a higher SCS (for example, $2f_0$) than the SCS ($=f_0$) constituting the slot. In this case, within one symbol (which may be referred to as, for example, a "long symbol") in the slot, multiple symbols (which may be referred to as, for example, "short symbols") with a higher SCS can be placed. In this short PUCCH, UCI and an RS are arranged in different short symbols. A multicarrier waveform (for example, the OFDM waveform) or a single-carrier waveform (for example, the DFT-s-OFDM) can be applied to this short PUCCH.

Also, in one or more symbols in a short PUCCH, UCI and an RS may be frequency-division-multiplexed (FDM). In this short PUCCH, UCI and an RS may be arranged in different frequency resources (for example, PRBs, resource units, resource elements, subcarriers, etc.). In this case, if a single-carrier waveform is applied to the short PUCCH, there is a possibility that the peak-to-average power ratio (PARR) may increase, so a multi-carrier waveform is preferable.

Note that, although FIG. 1A and FIG. 1B show examples in which the short PUCCH is mapped to the last symbol in the slot, the short PUCCH is by no means limited to this location. For example, a predetermined number of symbols at the beginning or in the middle of the slot may be symbols for arranging the short PUCCH.

Meanwhile, the long PUCCH is arranged over a plurality of symbols in the slot so as to improve the coverage over the short PUCCH. In the long PUCCH, UCI and an RS (for example, the DMRS) may be time-division-multiplexed (TDM) or frequency-division-multiplexed (FDM). The long PUCCH may be referred to as a "PUCCH with a lower (smaller, narrower, etc.) SCS" (for example, 15 kHz). Note that the time unit in which one long PUCCH is transmitted may be referred to as a "long TTI."

The long PUCCH may be comprised of a number of frequency resources to match the short PUCCH, or the long PUCCH may be formed with a smaller number of frequency resources (for example, one or two PRBs) than the short PUCCH, in order to achieve a power boosting effect. Also, the long PUCCH may be placed with the short PUCCH in the same slot.

For the long PUCCH, a single-carrier waveform (for example, DFT-s-OFDM waveform) may be used, or a multicarrier waveform (for example, OFDM waveform) may be used. In addition, frequency hopping may be applied to the long PUCCH per predetermined period within a slot (for example, per mini (sub) slot).

Note that the long PUCCH may be a PUCCH that is different from the PUCCHs (PUCCHs of different formats) stipulated in existing LTE systems (for example, LTE Rel. 8 to 13).

Figure 2A:
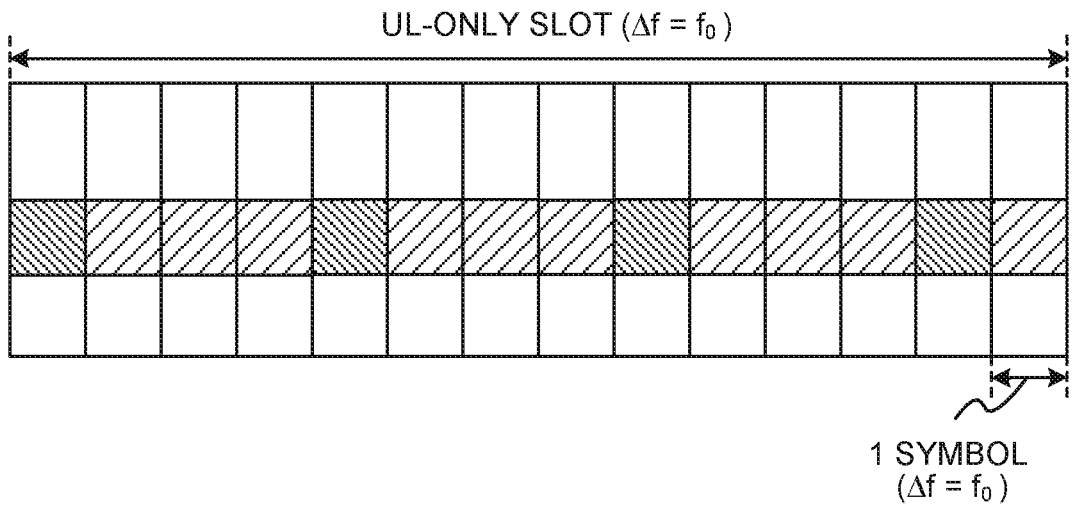
FIG. 2A and FIG. 2B are diagrams, each showing an example of a long PUCCH format in future radio communication systems.
Figure 2B:
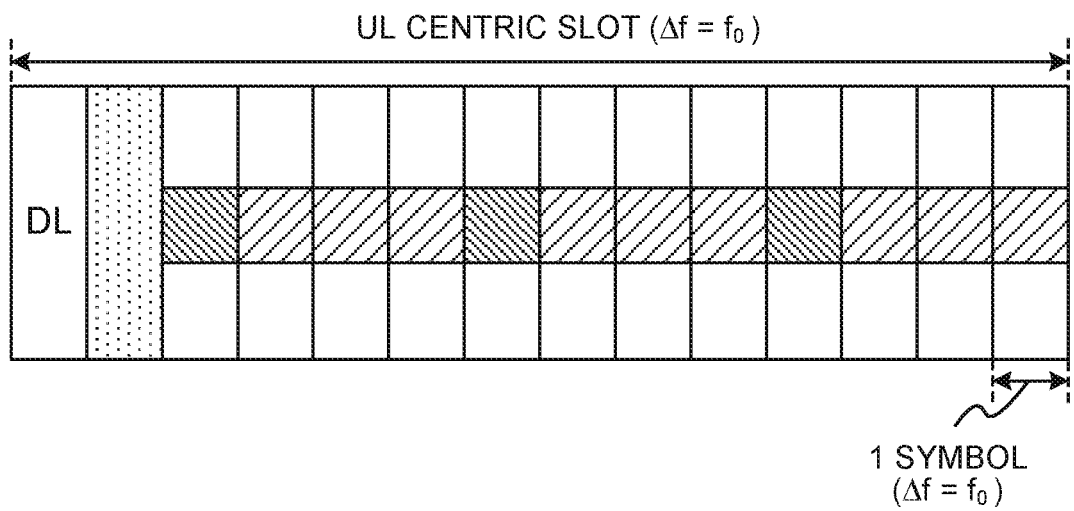

FIG. 2A and FIG. 2B are diagrams, each showing an example of a long PUCCH format in future radio communication systems. In these examples, one slot is formed with fourteen symbols, each having a subcarrier spacing of $\Delta f = f_0$ (for example, 15 kHz), but the number of symbols to be included in one slot is by no means limited to this.

FIG. 2A shows an example of a slot (UL-only slot), in which UL signals (for example, PUSCH and/or PUCCH) are transmitted/received, and FIG. 2B shows an example of a slot (UL-centric slot), in which a DL signal (for example, PDCCH) is transmitted and received in a predetermined number of symbols (here, the first one symbol), a symbol (gap period) for switching between DL and UL is provided, and UL signals (for example, PUSCH and/or PUCCH) are transmitted and received in the rest of the symbols. Note that the slots to which a long PUCCH can be applied are by no means limited to UL-only slots and/or UL-centric slots.

In the UL-only slot shown in FIG. 2A, the long PUCCH is arranged over all of the fourteen symbols in the slot. In the short PUCCH shown in FIG. 2A, the UCI is mapped over a plurality of UCI symbols (here, ten symbols) by at least one of spreading, repetition and coding.

In the UL-centric slot of FIG. 2B, the long PUCCH is placed over twelve symbols for UL signals in the slot. In the short PUCCH shown in FIG. 2B, the UCI is mapped over multiple UCI symbols (here, nine symbols) by at least one of spreading, repetition and coding.

Hereinafter, a "PUCCH," when simply mentioned so, may be read as "a short PUCCH and/or a long PUCCH."

The PUCCH may be time-division-multiplexed (TDM) and/or frequency-division-multiplexed (FDM) with a UL data channel (hereinafter also referred to as "PUCCH") in the slot. Also, the PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") within the slot.

In NR, the number of symbols to allocate to the PUCCH (which may be referred to as "PUCCH allocation symbols," "PUCCH symbols," etc.) may be determined on a per slot basis, on a per cell basis, on a per UE basis, or in a manner combining these. Since it is expected that the distance over which communication can be made increases in proportion to the number of PUCCH symbols, UEs located farther from a base station (for example, an eNB, a gNB, etc.) are likely to be operated to increase the number of symbols.

When supporting such UL control channels (for example, a short PUCCH and/or a long PUCCH, etc.) of various formats, it is necessary to implement the receiving algorithms on the base station side (including decoding, detection, etc.) and/or the transmission algorithms on the UE side for each of these UL control channels.

Now, in NR, a study is in progress to map the PUCCH near the last UL symbol in a slot. This is because the scheduling can be made easy. In NR, a PUCCH format, in which an RS is placed at the top (earlier) and UCI is placed behind, is under study.

The receiver (for example, a base station) performs the Fourier transform (FFT: Fast Fourier Transform) process per symbol, so that, if an RS is placed at the top, the demodulation and channel estimation processes for the RS can be started at the timing one symbol earlier than the demodulation of the UCI. Therefore, this is expected to shorten the time it takes for the PUCCH decoding is process, and, consequently, to contribute to the reduction of latency in communication.

FIG. 3A to FIG. 3D provide diagrams, each showing an example of a PUCCH format in which an RS is mapped to the first symbol. FIG. 3A to FIG. 3D show PUCCHs of two symbols, four symbols, twelve symbols and fourteen symbols, respectively. In any of these PUCCHs, an RS is mapped to the first symbol among the allocated symbols. Also, the mapping is designed so that the last symbol in a slot is the last symbol in the PUCCH.

In the examples shown in FIG. 3A to FIG. 3D, PUCCHs of varying lengths are provided for use by different UEs. The PUCCHs in FIG. 3A to FIG. 3D are used by UE 1 to UE 4, respectively. In this example, it is assumed that these PUCCHs are transmitted at the same timing, so that, in at least one PUCCH, the UCI in the symbol in which an RS is transmitted is punctured, so that a given UE's RS does not collide with another UE's UCI. This makes it possible to prevent the deterioration of the accuracy of measurements using RSs.

Note that puncturing refers to the process of generating UL data on the assumption that predetermined resources are available, and then removing data that matches the resources. Puncturing in this specification may be read as "rate matching." Rate matching refers to a method of generating signals with a small amount of UL data, on the assumption that data cannot be mapped to predetermined RE resources, and then mapping these signals to other allocation resources.

Figure 3A:
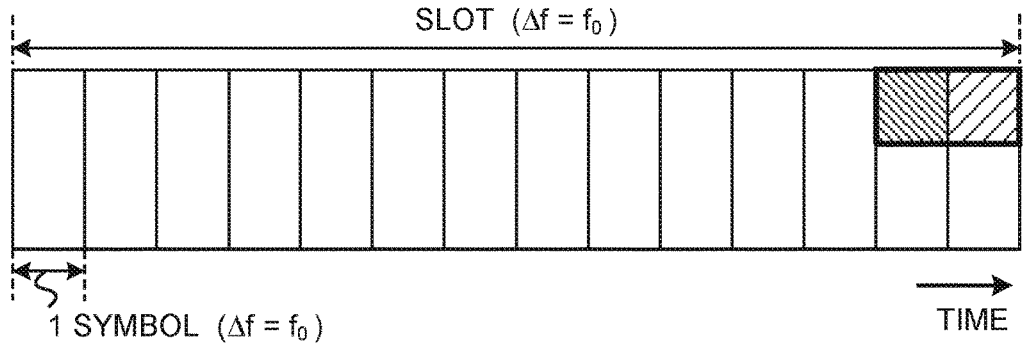
FIG. 3A to FIG. 3D are diagrams, each showing an example of a PUCCH format in which RS is mapped to the first symbol.
Figure 3B:
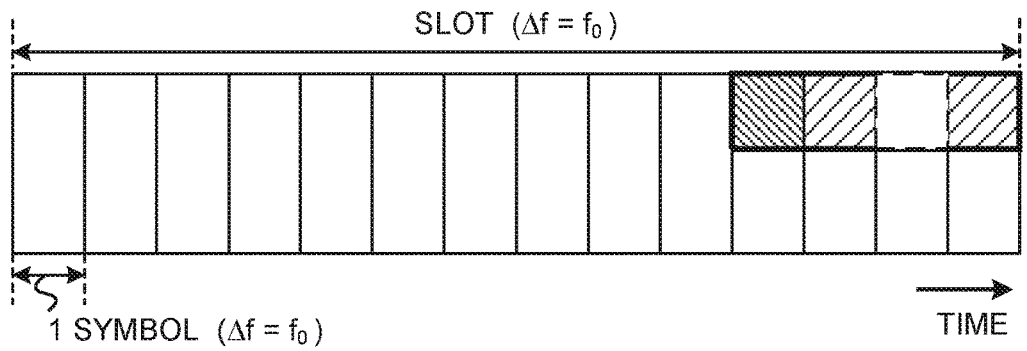
Figure 3C:
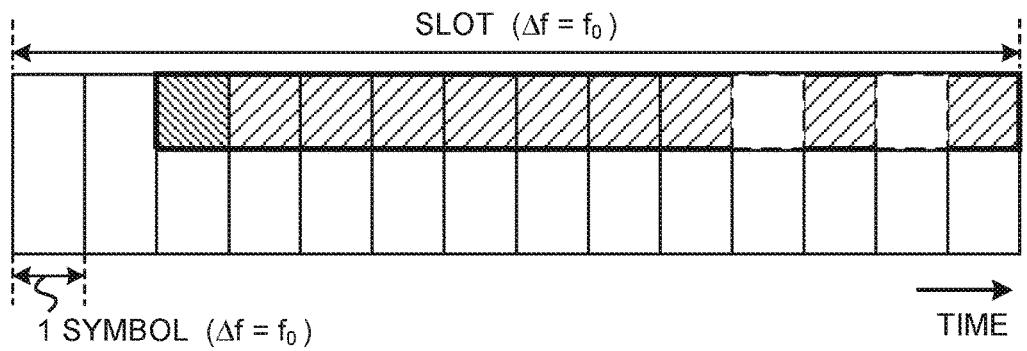
Figure 3D:
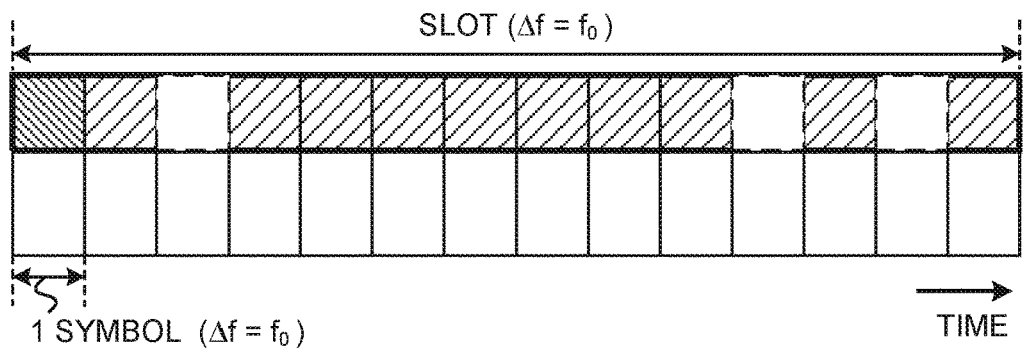

For example, in the two-symbol PUCCH of FIG. 3A, the symbol that is one symbol before the last symbol in the slot is punctured in all of the PUCCHs of FIG. 3B to FIG. 3D. Similarly, in the symbol that is three symbols before the last symbol in the slot and in the symbol that is eleven symbols before the last symbol in the slot, the UCI is punctured so as not to be mapped.

In this way, when PUCCHs carrying different numbers of symbols (different lengths of time resources) are used, the use of a simple mapping method might result in puncturing many UCI symbols, which then raises the problem that UCI cannot be transmitted efficiently. In this case, the communication throughput, spectral efficiency and so on might be degraded.

Here, the present inventors have focused on the fact that it is not necessarily effective to arrange RSs before UCI. For example, one symbol is approximately 66.67 μs if the SCS is 15 kHz, and one symbol is 8.3 μs if the SCS is 120 kHz. In this way, the time one symbol lasts is short if the SCS is high, so, even when RSs are placed before UCI, this does not contribute much to the reduction of latency. Also, if the demodulation process cannot be started until both RSs and UCI have been received (for example, when maximum likelihood detection (MLD) is used), arranging RSs before UCI provides little advantage.

Thus, the present inventors have studied a method of suppressing puncturing of UCI symbols even when PUCCHs carrying different numbers of symbols are used, and arrived at the present invention. According to one aspect of the present invention, in a given PUCCH format, RSs are transmitted in the same symbol positions as in other PUCCH formats, so that it is possible to suppress puncturing UCI for reduced RS-induced interference.

Now, embodiments of the present invention will be described in detail below with reference to the accompanying drawings. Note that the radio communication methods of the above-described embodiments may be applied individually or may be applied in combination.

In each of the following embodiments, a "symbol (symbol position)" might mean a "symbol (symbol position)" (time resource) presuming a predetermined numerology (for example, a predetermined. SCS value).

Also, assume that the user terminals support one or more SCSs (for example, 15 kHz, 30 kHz, 60 kHz, 120 kHz, 240 kHz, etc.) Although the following description will assume that the SCS ($\Delta f$) in normal symbols (for example, data symbols) within a slot is $f_0$ (for example, 15 kHz), this is by no means limiting. The SCS in normal symbols (for example, data symbols) within a slot may be referred to as the "base SCS."

Radio Communication Method

First Embodiment

According to a first embodiment of the present invention, a UE transmits UCI using one of a plurality of PUCCH formats in which RSs are transmitted (RSs are allocated) in the same symbol positions. Here, a PUCCH structure may refer a resource structure related to UCI and/or reference signals for UCI (for example, the demodulation reference signal), and may be referred to as, for example, a "PUCCH format."

RS Positions

In multiple PUCCH formats, an RS may be mapped to the last symbol of the PUCCH allocation symbols. PUCCH allocation symbols refer to one or more symbols, which have predetermined PUCCH formats and which can be used to map UCI and/or RSs for UCI.

PUCCHs for UEs with different numbers of PUCCH symbols (that is PUCCHs of different PUCCH formats) are preferably multiplexed so that the mapping positions of RSs are the same. As a result of this, RSs are mapped to the same symbol positions irrespective of the number of PUCCH symbols.

FIG. 4A to FIG. 4D provide diagrams, each showing an example of a PUCCH format according to the first embodiment of the present invention. FIG. 4A to FIG. 4D show PUCCHs of two symbols, four symbols, twelve symbols and fourteen symbols, respectively. All of these PUCCHs are structured so that RS is mapped to the last symbol (to the n-th symbol in the event a PUCCH contains n symbols) among the symbols subject to allocation.

PUCCHs that contain varying numbers of symbols as shown in FIG. 4A to FIG. 4D may be used for different UEs. For example, the PUCCHs of FIG. 4A to FIG. 4D may be used for UE 1 to UE 4, respectively.

Note that the payload of one UCI may be spread and mapped over a plurality of symbols, may be repeated and mapped over a plurality of symbols, or may be encoded over multiple symbols.

In a given PUCCH format, RSs may be mapped to symbols other than the last symbol among the PUCCH symbols. When the number of PUCCH symbols exceeds a predetermined value X, RSs may be mapped to the symbols of every integer multiple of the predetermined value X before and/or after a predetermined reference symbol.

For example, when the number of PUCCH symbols exceeds a predetermined value X, a format may be adopted in which RSs are mapped to the symbols of every integer multiple of X in the forward direction (earlier in time) with respect to the last symbol of the PUCCH symbols. In this case, RSs are mapped to every (integer multiple of X+1)-th symbol from the end of the PUCCH symbols (the last symbol is the first symbol from the end). The number of RSs to be mapped can be determined by ceil (the number of PUCCH symbols/X) (where ceil ( ) is a ceiling function).

By adopting such a format, it is possible to increase the density of RSs according to needs (for example, depending on the length of the PUCCH), and to improve the accuracy of channel estimation.

Note that the above-mentioned threshold X may be referred to as the "threshold related to PUCCH symbols," the "RS symbol cycle" and so on.

FIG. 5A to FIG. 5D provide diagrams, each showing an example of a format in which the number of RSs increases when the number of PUCCH symbols exceeds a predetermined value. FIG. 5A to FIG. 5D show PUCCHs containing the same numbers of symbols as in FIG. 4A to FIG. 4D, respectively. However, when the number of PUCCH symbols exceeds a predetermined value X (=4), the difference is that RSs are mapped every X symbols in the forward direction with respect to the last symbol of the PUCCH symbols.

Figure 5A:
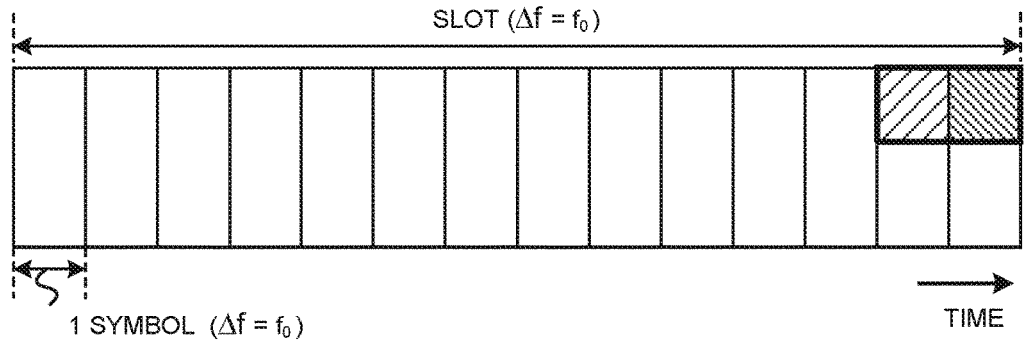
FIG. 5A to FIG. 5D provide diagrams, each showing an example of a format in which the number of RSs increases when the number of PUCCH symbols exceeds a predetermined value.
Figure 5B:
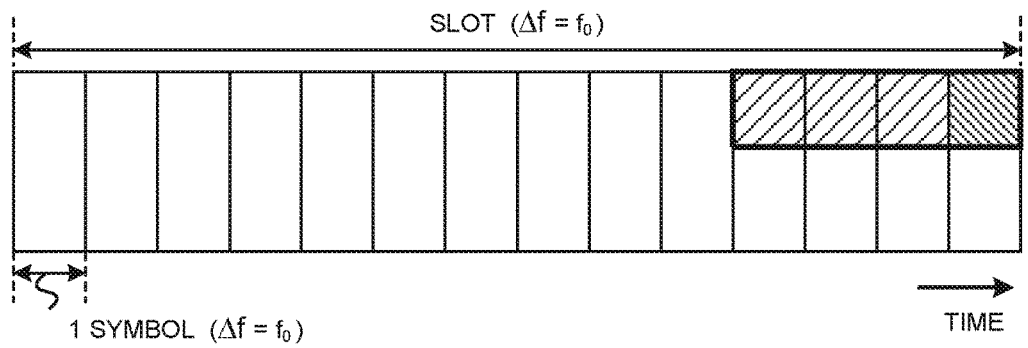
Figure 5C:
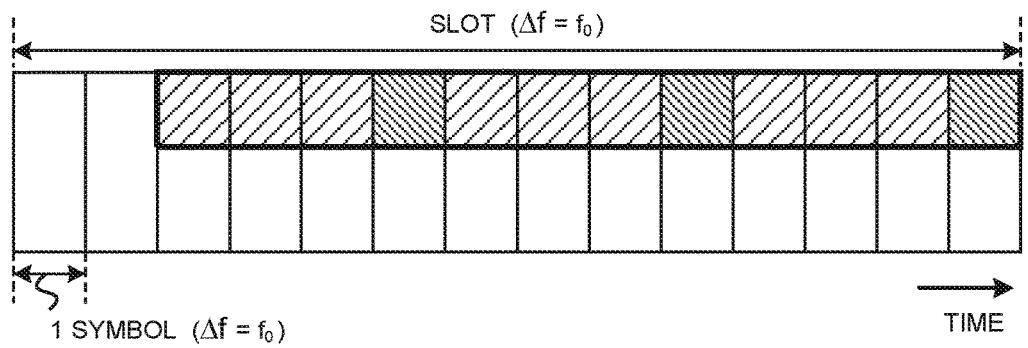
Figure 5D:
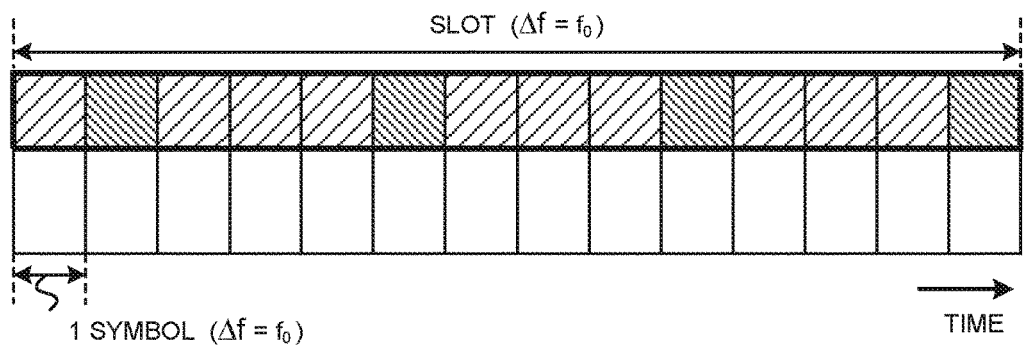

In this example, when the number of PUCCH symbols is four or less, RSs are mapped only to the last symbol, as shown in FIG. 5A and FIG. 5B. Otherwise, as shown in FIG. 5C and FIG. 5D, if the symbol index of the last symbol is #z, RSs are mapped to the positions of symbol indices #z–X, #z–2X and so on.

FIG. 6A to FIG. 6D provide diagrams, each showing another example of a format in which the number of RSs increases when the number of PUCCH symbols exceeds a predetermined value. FIG. 6A to FIG. 6D show PUCCHs containing the same numbers of symbols as in FIG. 4A to FIG. 4D, respectively. However, when the number of PUCCH symbols exceeds a predetermined value X (=7), the difference is that RSs are mapped every X symbols in the forward direction with respect to the last symbol of the PUCCH symbols.

Figure 6A:
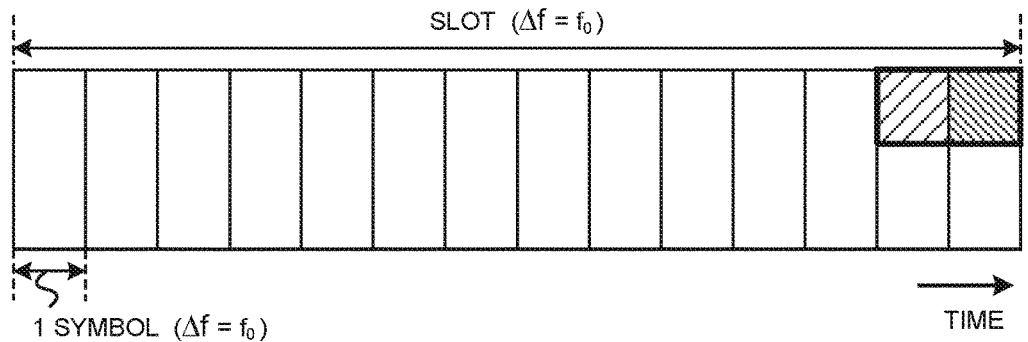
FIG. 6A to FIG. 6D provide diagrams, each showing another example of a format in which the number of RSs increases when the number of PUCCH symbols exceeds a predetermined value.
Figure 6B:
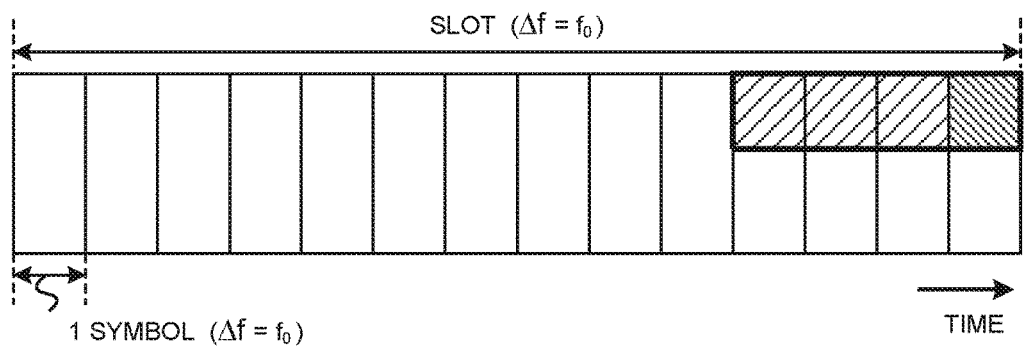
Figure 6C:
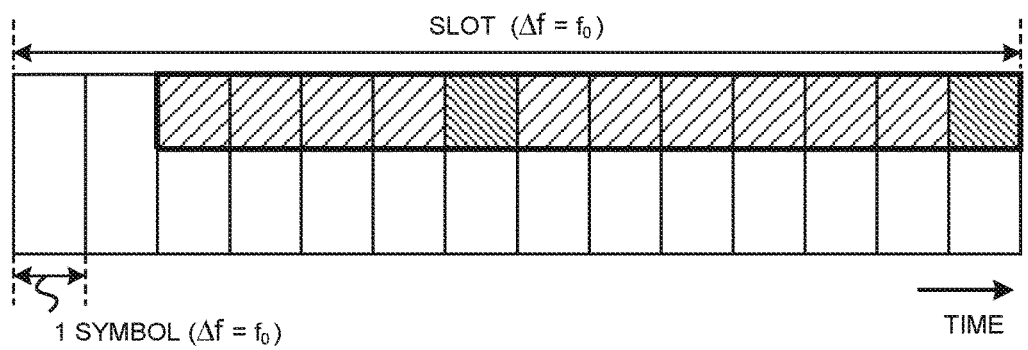
Figure 6D:
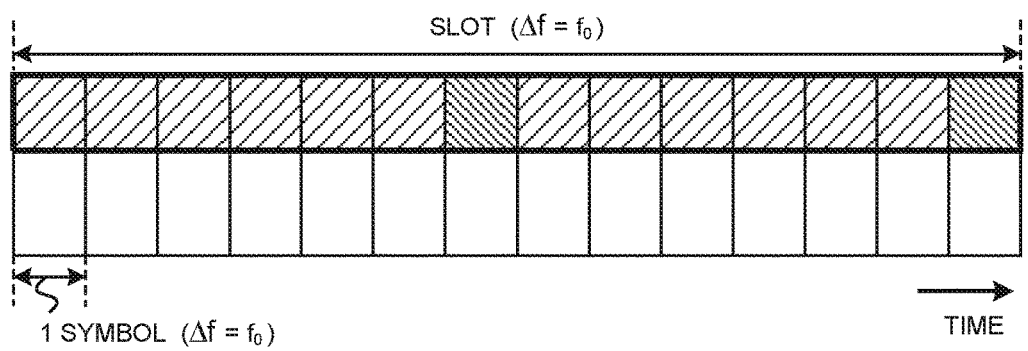

In this example, when the number of PUCCH symbols is seven or less, RSs are mapped only to the last symbol, as shown in FIG. 6A and FIG. 6B. Otherwise, as shown in FIG. 6C and FIG. 6D, if the symbol index of the last symbol is #z, RSs are mapped to the positions of symbol indices #z–X, #z–2X and so on. As can be seen from FIG. 5 and FIG. 6, the overhead of RSs can be reduced as X becomes larger.

Note that when a plurality of RSs can be mapped within one PUCCH, a format in which some RSs are not mapped may be adopted.

Also, although the examples of FIG. 4 to FIG. 6 each show examples in which the SCS of the PUCCH is the same as the base SCS (for example, the SCS of data symbols), this is not limiting. For example, the SCS for the PUCCH may be wider than the base SCS, and, in this case, the number of PUCCH symbols described above may be read as the number of symbols (for example, short symbols) in accordance with the SCS of the PUCCH.

FIG. 7A to FIG. 7D provide diagrams, each showing an example of a PUCCH format for use when the SCS of a PUCCH is wider than the base SCS. FIG. 7A to FIG. 7D show PUCCHs containing two, four, eight and four symbols (short symbols in the drawing), respectively. In FIG. 7A to FIG. 7D, the SCSs of the PUCCHs are $2f_0$, $4f_0$, $8f_0$ and $2f_0$, respectively. Furthermore, assume that X is 4, as described above.

Figure 7A:
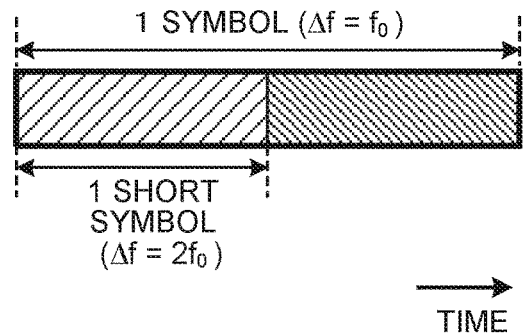
FIG. 7A to FIG. 7D provide diagrams, each showing an example of a PUCCH format for use when the SCS of a PUCCH is wider than the base SCS.
Figure 7B:
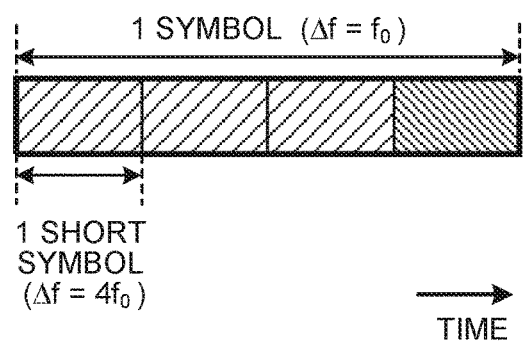
Figure 7C:
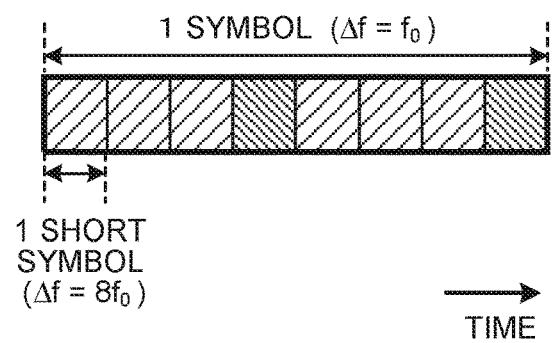
Figure 7D:
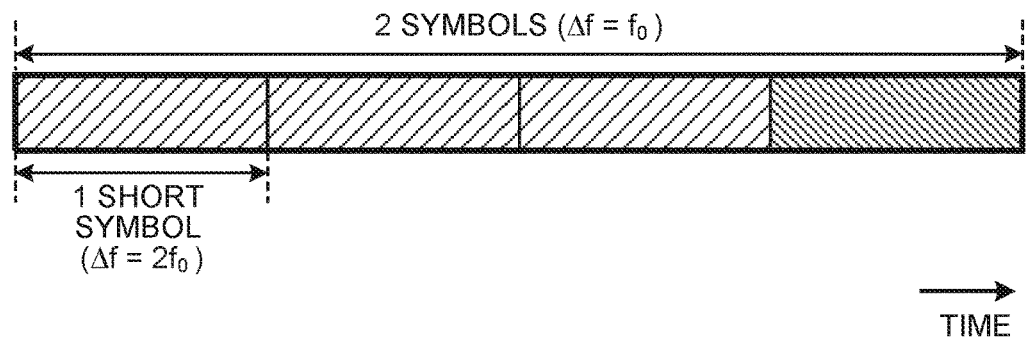

In FIG. 7A to FIG. 7C, the number of PUCCH symbols is equal to or less than the value obtained by dividing the SCS of the PUCCH by the base SCS, so that it is possible to map the PUCCH within the normal symbol duration. In FIG. 7D, the number of PUCCH symbols is greater than the value obtained by dividing the SCS of the PUCCH by the base SCS, it is possible to map the PUCCH within a duration of a plurality of normal symbol (two symbols in this case).

Multiplexing of Multiple PUCCHs

The method for multiplexing PUCCHs for multiple UEs will be described. Now, the following description will be given assuming the above-described PUCCH formats (PUCCH formats in which, when the number of PUCCH symbols exceeds a predetermined value X, RSs are mapped to the symbols of every integer multiple of X that are in the forward direction with respect to the last symbol of the PUCCH symbols), but this is by no means limiting. In addition, although the following description in this specification will assume that X=4 unless specified otherwise, the value of X is by no means limited to this.

Hereinafter, (1) multiplexing of PUCCHs in which the number of PUCCH symbols is X or more, (2) multiplexing of PUCCHs in which the number of PUCCH symbols is less than X, and (3) multiplexing of a PUCCH in which the number of PUCCH symbols is X or more with a PUCCH in which the number of PUCCH symbols is less than X will be described in order. In the following description, for simplicity, one PUCCH will be referred to as a "unit." Multiple units are assumed to be transmitted in the same frequency resources (for example, in the same PRB).

Multiplexing of PUCCH in which the Number of PUCCH Symbols is X or More

FIG. 8 is a diagram to show an example of multiplexing a PUCCH in which the number of PUCCH symbols is X or more. In this example, units 1 to 3, each comprised of four symbols, are multiplexed with unit 4 comprised of twelve symbols. The RSs in units 1 to 3 comprised of the smaller number of symbols are mapped to symbols that are the same as some of the RSs in unit 4 comprised of the larger number of symbols. Note that the following examples of multiplexing in this specification will assume that the symbols of unit 1 includes the last symbol of the slot, unless specified otherwise.

Units comprised of the smaller number of symbols may be multiplexed so that RSs are mapped to the same symbol as the RS of the last symbol in the unit with the greater number of symbols (unit 1 and 4), or may be multiplexed so that the RSs are mapped to symbols that are same as the RSs in symbols other than the last symbol in the unit with the greater number of symbols (unit 2 or 3, and unit 4).

The UCIs to be time-division-multiplexed (TDM) may be UCIs for different UEs (for example, unis 1 to 3 may correspond to UEs 1 to 3, respectively), or may be UCIs for the same UE (for example, unis 1 to 3 may correspond to UE 1). In the latter case, UCIs related to a plurality of serving cells used by one UE may be time-division-multiplexed (TDM), or UCIs for multiple MIMO (Multi-Input Multi-Output) layers may be time-division-multiplexed (TDM).

FIG. 9 is a diagram to show another example of multiplexing of PUCCHs in which the number of PUCCH symbols is X or more. In this example, unit 1 comprised of four symbols and unit 2 comprised of eight symbols are multiplexed with unit 3 comprised of twelve symbols. The RSs of units 1 and 2 comprised of the smaller number of symbols are mapped to symbols that are the same as some of the RSs in unit 3 comprised of the larger number of symbols.

Here, unit 2 assumes a format in which RSs are mapped only to the last symbol in the PUCCH regardless of the value of X. In this case, as shown in FIG. 9, the UCI in unit 2, located in the same symbol as an RS in unit 3, may be punctured. In this way, part of the UCI symbol in a PUCCH may be punctured.

FIG. 10 is a diagram to show yet another example of multiplexing of PUCCHs in which the number of PUCCH symbols is X or more. This example is similar to the example of FIG. 8, except that the same UCI is transmitted in units 2 and 3. Over a plurality of units (here unit 2 and 3), one UCI is mapped by using at least one of spreading, repetition and coding. For units 2 and 3, the base station can improve the accuracy of channel estimation by using a plurality of RSs included in these units, and improve the received quality.

Multiplexing of PUCCH in which the Number of PUCCH Symbols is Less than X

FIG. 11 is a diagram to show an example of multiplexing a PUCCH in which the number of PUCCH symbols is less than X. In this example, the units 1 to 3 composed of two symbols is multiplexed with each other. Note that the PUCCH symbols may be comprised of symbols that are consecutive in the time domain like unit 1, or may be comprised of symbols that are not consecutive in the time domain like units 2 and 3. The RSs in units 1 to 3 are mapped to the same symbol (here, the last symbol in the PUCCH). Multiple RSs mapped to the same symbol may be code-division-multiplexed (CDM: Code Division Multiplexing).

If there are units in which the number of PUCCH symbols less than X, it is preferable to apply mapping so that the position of the UCI symbol varies among a plurality of units. In the case of FIG. 11, the UCIs in units 1 to 3 are mapped one symbol, two symbols and three symbols before the last symbol in the slot, respectively. In this way, when the format to shift the UCI symbol one symbol at a time, between units, is adopted, it is possible to time-division-multiplex (TDM) the UCIs in X−1 units.

In this specification, the number of PUCCH symbols may be read as the number of PUCCH symbols where UCI and/or RSs are actually mapped (the number of PUCCH symbols, not including punctured symbols). For example, unit 2 in FIG. 11 may be a unit that is formed with three symbols, including the last symbol, where one symbol is punctured from the two symbols of UCI. Also, unit 3 in FIG. 11 may be a unit that is formed with four symbols, including the last symbol, where the UCI is mapped by puncturing two symbols from the three symbols of UCI.

The UCIs to be time-division-multiplexed (TDM) may be UCIs for different UEs (for example, units 1 to 3 may correspond to UEs 1 to 3, respectively), or may be UCIs for the same UE (for example, units 1 to 3 may correspond to UE 1).

Note that the number of UCI symbols in a unit may be greater than 1. The number of UCI symbols (in other words, the UCI density (or the RS density) in the PUCCH) may vary per unit. That is, units with varying numbers of symbols may be multiplexed.

Figure 12:
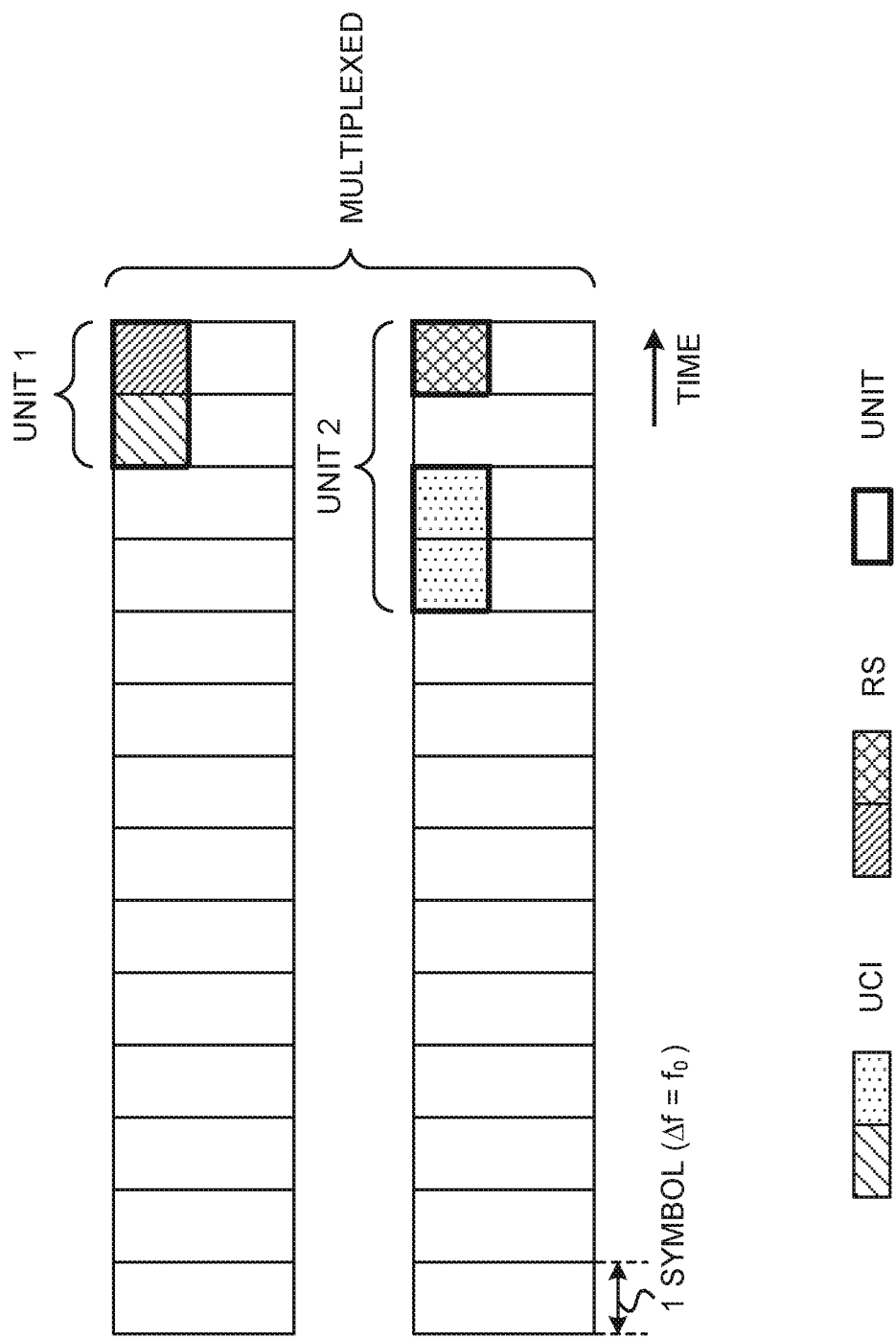
FIG. 12 is a diagram to show another example of multiplexing a PUCCH in which the number of PUCCH symbols is less than X.

FIG. 12 is a diagram to show another example of multiplexing of PUCCHs in which the number of PUCCH symbols is less than X. In this example, unit 1 comprised of two symbols and unit 2 comprised of three symbols are multiplexed with each other. The RSs in units 1 to 2 are mapped to the same symbol (here, the last symbol in the PUCCH).

In the case of FIG. 12, the UCI of unit 1 is mapped to the symbol that is one symbol before the last symbol in the slot, and the UCI of unit 2 is mapped to the symbols that are two symbols and three symbols before the last symbol.

Note that symbols that are X symbols or more apart from the RS and that do not overlap with RSs in other units may serve as symbols for multiplexing UCI. Also, UCI may be mapped to the same symbol between units.

Figure 13:
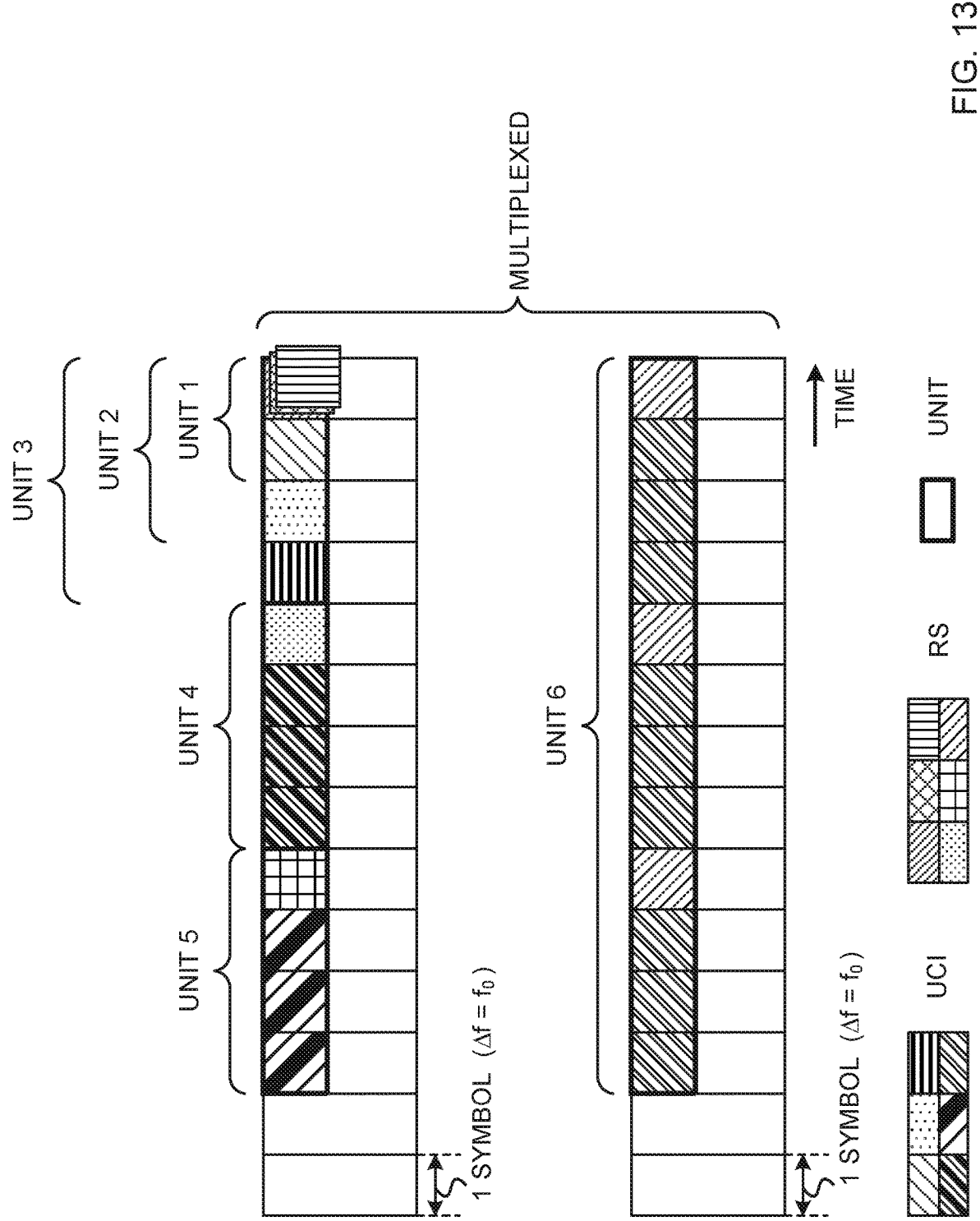
FIG. 13 is a diagram to show an example of multiplexing a PUCCH in which the number of PUCCH symbols is X or more and a PUCCH in which the number of PUCCH symbols is less than X.

Multiplexing of PUCCH in which the Number of PUCCH Symbols is X or More and PUCCH in which the Number of PUCCH Symbols is Less than X FIG. 13 is a diagram to show an example of multiplexing of a PUCCH in which the number of PUCCH symbols is X or more and a PUCCH in which the number of PUCCH symbols is less than X. In this example, units 1 to 3 that are comprised of two symbols are multiplexed with each other, and, furthermore, multiplexed with unit 6 that is comprised of twelve symbols. Also, units 4 and 5 comprised of four symbols are also multiplexed with unit 6. The multiplexing shown in FIG. 13 can be realized by combining the multiplexing methods described so far.

Note that, although examples have been shown above in which the last symbol of a slot is included in the symbols of at least one unit (PUCCH), a format may be adopted here in which all the PUCCH symbols do not include the last symbol of the slot. This enables flexible scheduling.

Figure 14:
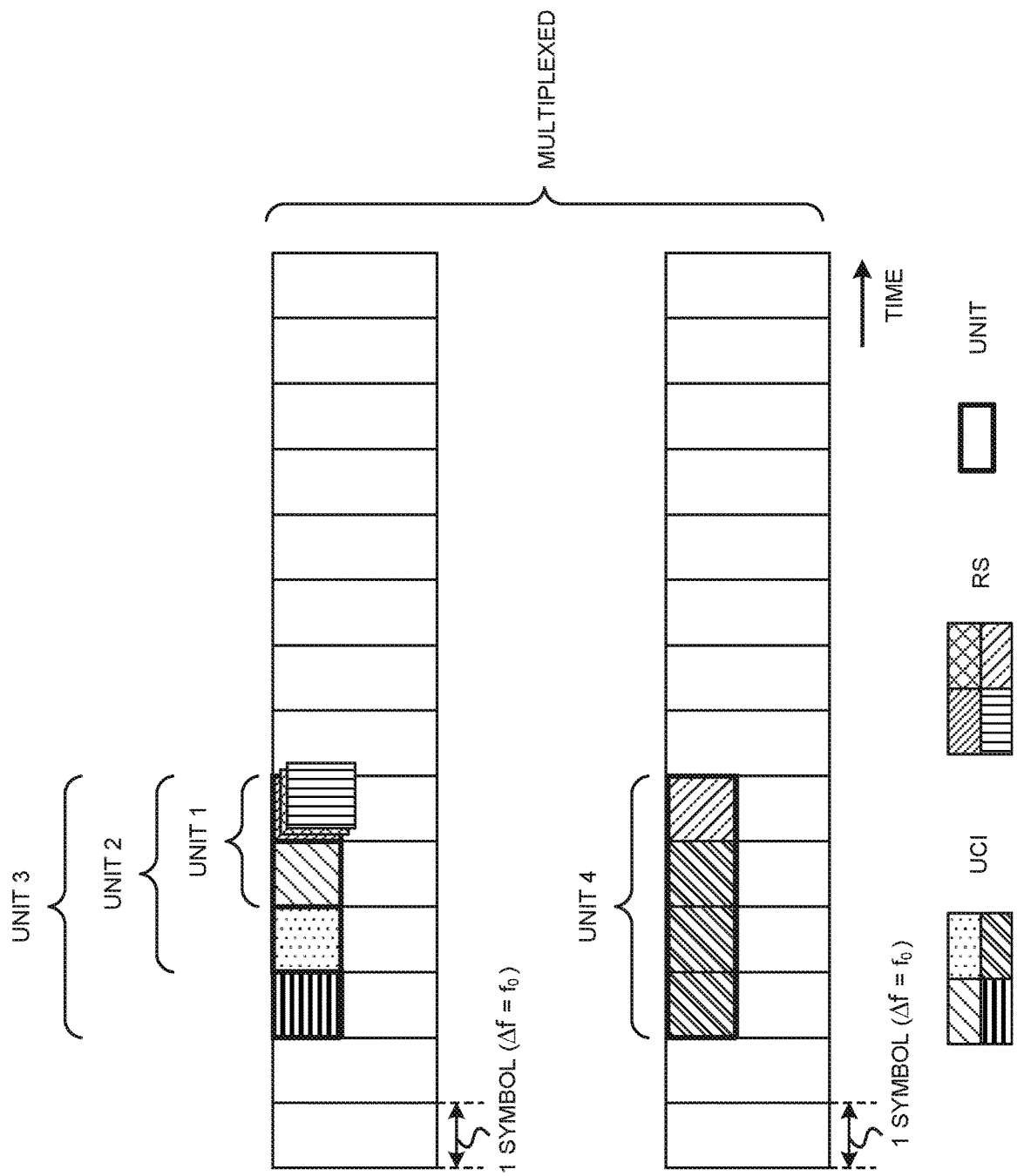
FIG. 14 is a diagram to show an example of a case where all PUCCH symbols do not include the last symbol of a slot.

FIG. 14 is a diagram to show an example of a case where all the PUCCH symbols do not include the last symbol of a slot. In this example, unis 1 to 3 that are each comprised of two symbols are multiplexed with each other, and, furthermore, multiplexed with unit 4 that is comprised of four symbols. The last symbol of the PUCCH symbols in these units is not the last symbol of a slot.

Determining PUCCH Format

A UE may learn the number of PUCCH symbols via a report (configuration, command, etc.) from the network (for example, a base station). Information about the number of PUCCH symbols may be reported to the UE via higher layer signaling (for example, RRC (Radio Resource Control) signaling, MAC (Medium Access Control) signaling, broadcast information (the MIB (Master Information Block), SIBs (System Information Blocks), etc.), physical layer signaling (for example, DCI), or a combination of these. By using information about the number of PUCCH symbols, the UE can clearly identify the PUCCH format to use to transmit UCI.

The information about the number of PUCCH symbols may be the explicit number of PUCCH symbols. In this case, the UE may determine the number of PUCCH symbols based on the reported information, and map the UCI and the RS in the PUCCH based on the number of PUCCH symbols.

In addition, the information about the number of PUCCH symbols (and/or PUCCH resources) may be information about the candidates for the number of PUCCH symbols. The candidate numbers of PUCCH symbols (and/or PUCCH resources) may be stipulated in the specification. The UE may determine the number of PUCCH symbols (and/or PUCCH resources) to use to transmit the UCI from among the reported or predetermined candidates.

For example, the UE may determine the number of PUCCH symbols (and/or PUCCH resources) to use to transmit the UCI based on the received quality of predetermined signals (for example, reference signals, synchronization signals, etc.), the number of HARQ (Hybrid Automatic Repeat reQuest) retransmissions of predetermined signals (for example, a UL data signal) and so on. If the received quality is poor and/or the number of HARQ retransmissions is high, the UE may decide to transmit the UCI using a PUCCH resource with a large number of symbols.

The value of the RS symbol cycle X may be reported via higher layer signaling (for example, RRC signaling, broadcast information, etc.), physical layer signaling (for example, DCI), or a combination of these, or may be stipulated in the specification.

The UE may assume that RSs are mapped to the symbol at a predetermined position (for example, the last symbol, the first symbol, etc.) among the PUCCH symbols. Also, the UE may assume that, among the PUCCH symbols, RSs are mapped to the symbols corresponding to every integer multiple of X in the forward direction (and/or in the backward direction) with respect to the above predetermined position.

Information regarding the predetermined RS position (mapping position) in the PUCCH symbols may be reported to the UE via higher layer signaling (for example, RRC signaling, broadcast information, etc.), physical layer signaling (for example, DCI) or a combination of these.

For example, this mapping position-related information may be information to indicate a specific symbol (for example, the last symbol, the first symbol, etc.) among the PUCCH symbols, or information to indicate a specific symbol (for example, the i-th (where i is an integer) symbol (or a short symbol)) included in a predetermined time unit (for example, a subframe, a slot, a minislot, a subslot, etc.).

Based on the information communicated, the UE determines the PUCCH format (the resource mapping of RS and UCI) for the PUCCH resources allocated to the subject UE.

Figure 15A:
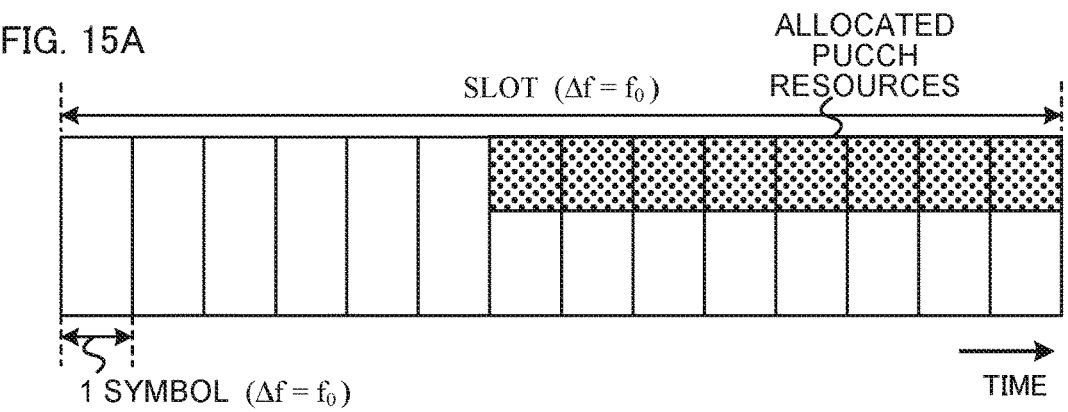
FIG. 15A to FIG. 15D provide diagrams, each showing an example of determining the PUCCH format.
Figure 15B:
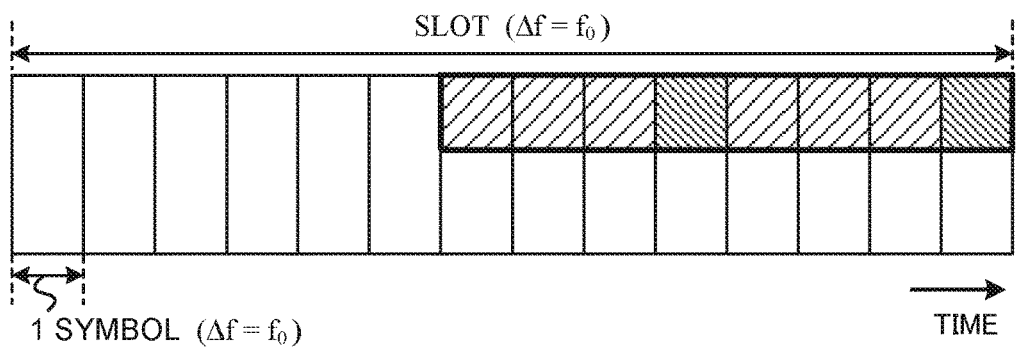
Figure 15C:
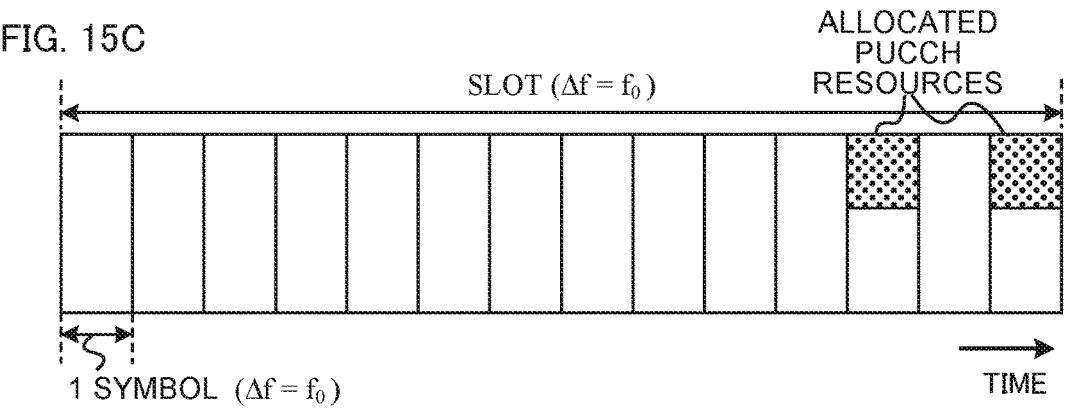

FIG. 15A to FIG. 15D provide diagrams, each showing an example of determining the PUCCH format. FIG. 15A and FIG. 15C show PUCCH resources, which are both allocated to the UE, and in which the number of symbols is eight and two. In this example, assuming that X=4 has been reported, given the PUCCH resources of FIG. 15A, as shown in FIG. 15B, the UE may map RSs to the last symbol and to the symbol that is four symbols before the last symbol, and map UCI to the other six symbols.

Figure 15D:
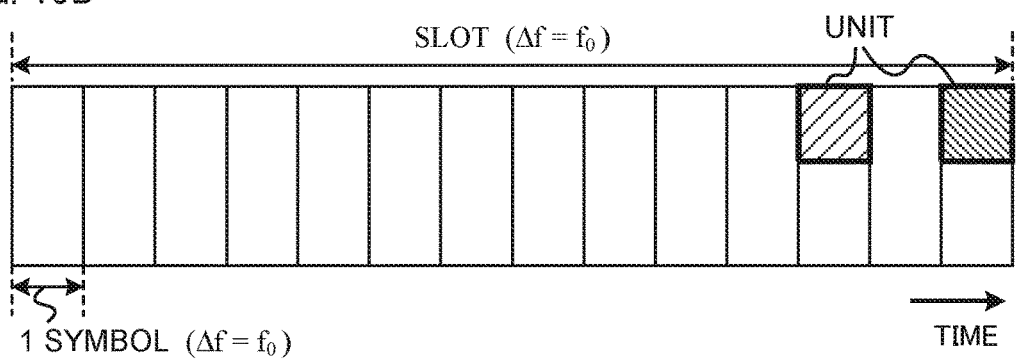

Also, given the PUCCH resources of FIG. 15C, the UE may map an RS to the last symbol and map UCI to the symbol that is two symbols before the last symbol, as shown in FIG. 15D.

RS and UCI Sequences

The UE generates RS sequences to be transmitted with the UCI based on RS base sequences (base sequences). An RS base sequence may be a CAZAC (Constant Amplitude Zero Auto-Correlation) sequence (for example, a Zadoff-Chu sequence), or may be a sequence conforming to a CAZAC sequence, such as one that is specified in 3GPP TS 36.211 § 5.5.1.2 (in particular, Table 5.5.1.2-1 and Table 5.5.1.2-2) and so on (CG-CAZAC (Computer-Generated CAZAC) sequence).

Information about base sequences may be reported to the UE through higher layer signaling and/or physical layer signaling. Information about the selection of the CAZAC sequence, information about the amount of phase rotation of the CAZAC sequence, information about the sequence conforming to a CAZAC sequence (for example, information about the rows and/or columns in the above tables (information as to which row and/or column the value that is used corresponds)) and suchlike pieces of information may be reported to the UE.

As data sequences for the UCI, predetermined base sequences (data base sequences) that are modulated based on predetermined modulation schemes (for example, BPSK (Binary Phase Shift Keying), QPSK (Quadrature Phase Shift Keying), etc.) may be used. As the data base sequences, as with the RS base sequences, a CAZAC sequence, a sequence conforming to a CAZAC sequence and so on may be assumed, or a sequence that is different from a CAZAC sequence (a real number (for example, a sequence of 1+i0 (where i is an imaginary number)) may be assumed.

Also, the UE may apply code division multiplexing (CDM) to the RS sequence and/or the UCI data sequence. The UE may apply, for example, at least one of varying codes, varying orthogonal spreading and varying cyclic shifts between UEs, to the RS sequences and/or the UCI data sequences. In this case, a plurality of UEs can share the same frequency and time resources, so that it is possible to improve the efficiency of the use of resources.

Resource mapping of RS sequences will be described. As described above, one or more RSs are mapped within one PUCCH (unit). Consequently, RSs can be mapped as follows:

(1) Allocating base sequences within RS symbols (intra-symbol allocation); and (2) Allocating base sequences across RS symbols (inter-symbol allocation). Note that allocating a base sequence may be read as allocating an RS sequence that is based on a base sequence.

In above (1) and (2), the PUCCH frequency resources may be formed with one or a plurality of predetermined frequency units (for example, subcarriers, PRBs, etc.).

Referring to the above mapping method of (1), assuming that the number of RS subcarriers in one symbol is m, m base sequences $X_0, X_1, \ldots, X_{m-1}$ (sequence length: m) are generated, these base sequences are allocated to the subcarriers for RS resources in the RS symbol. This method makes it easy to multiplex UEs with different numbers of PUCCH symbols (with different number of PRBs), and improves the flexibility of scheduling.

The above mapping method of (2) can be further divided into the following two parts:

(2-1) Allocating base sequences within all PRBs (all PRBs in all RS symbols); and (2-2) Allocating base sequences within a PRB group (a set of some PRBs among all PRBs in all RS symbols).

Referring to the mapping method of (2-1) above, assuming that the number of RS subcarriers in one symbol is m and the number of RS symbols in the PUCCH is N, N*m base sequences $X_0, X_1, \ldots, X_{(N*m)-1}$ (sequence length: N*m) are generated, and these base sequence are allocated to the subcarriers for RS resources in all RS symbols.

Referring to the mapping method of (2-2) above, assuming that the number of RS subcarriers in one symbol is m and the number of RS symbols in a PRB group is K, K*m base sequences $X_0, X_1, \ldots, X_{(K*m)-1}$ (sequence length: K*m) are generated, and these base sequences are allocated to the subcarriers for RS resource in the PRB group.

As described above, since, according to the above method of (2), the sequence length becomes long and the number of sequences increases, many UEs can be multiplexed, so that the efficiency of the use of resources can be improved.

Regardless of which mapping method is used, phase rotation may be applied, on a per symbol basis, with varying phase rotation amounts.

When the frequency resources of the PUCCH are one PRB, the method of (1) may be referred to as "a mapping method to allocate base sequences within a PRB (intra-PRB)," and the method of (2) may be referred to as "a mapping method to allocate base sequences across PRBs (inter-PRB)."

Although, for the sake of simplicity, a case where the frequency resources of a PUCCH are one PRB will be described below as an example, mapping can be performed based on the same policy even when the frequency resources for a PUCCH are is formed with other bands.

Figure 16:
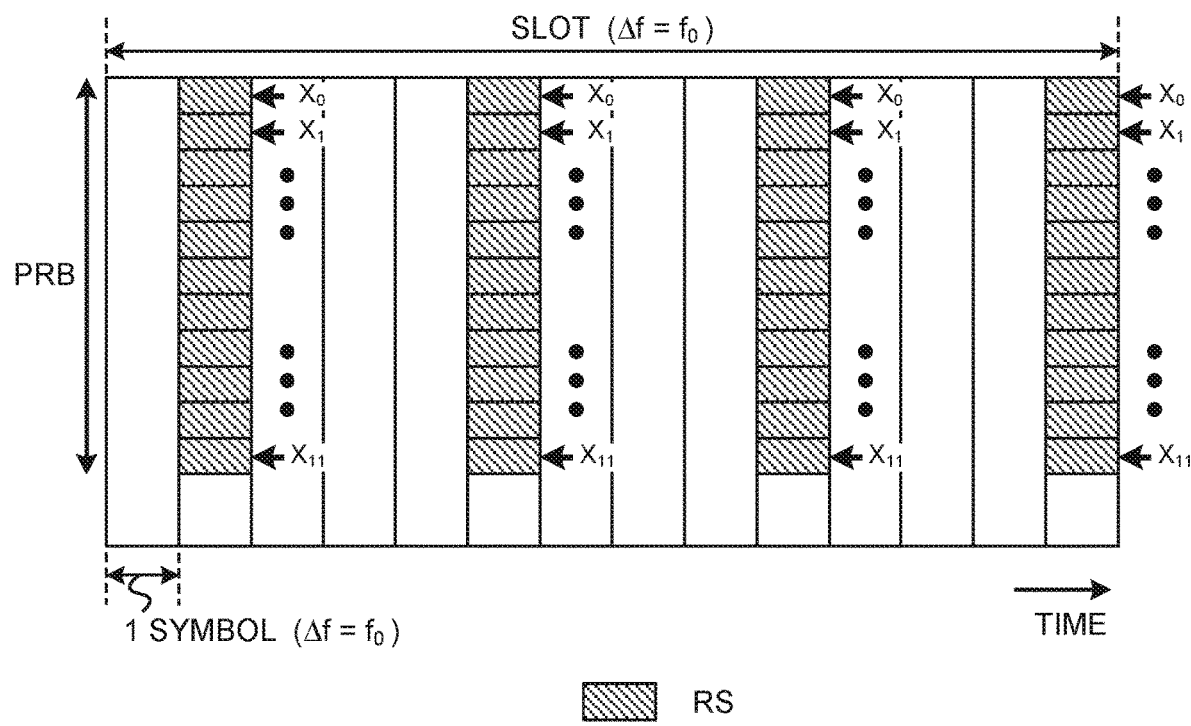
FIG. 16 is a diagram to show an example of resource mapping when RS base sequences are allocated in PRBs.

FIG. 16 is a diagram to show an example of resource mapping when RS base sequences are allocated within a PRB. This example shows RS resource mapping assuming the PUCCH format (RS format) of FIG. 4D. In this case, m=12. For each RS symbol, the UE maps base sequences $X_0, X_1, \ldots, X_{11}$ to the RS subcarriers in the PRB.

Figure 17:
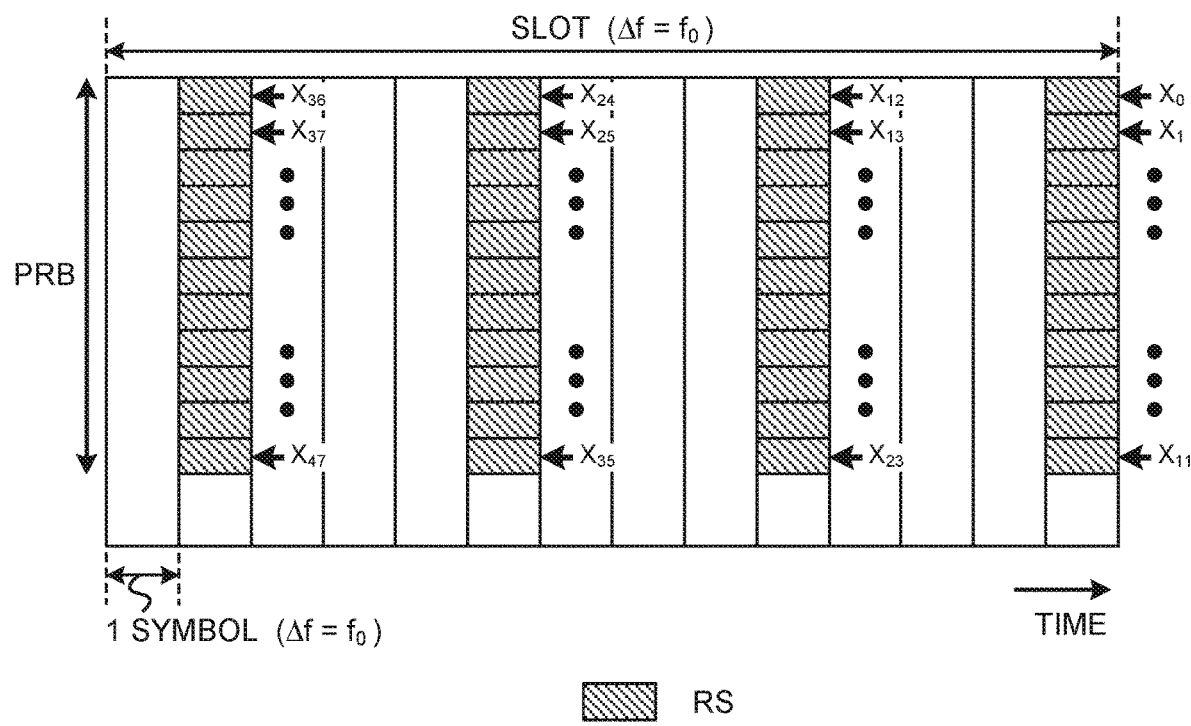
FIG. 17 is a diagram to show an example of resource mapping when RS base sequences are allocated in all transmitting PRBs.

FIG. 17 is a diagram to show an example of resource mapping when RS base sequences are allocated in all the transmitting PRBs. This example shows RS resource mapping assuming the PUCCH format (RS format) of FIG. 4D. In this case, m=12 and N=4. The UE generates base sequences $X_0, X_1, \ldots, X_{47}$ (sequence length=48), and maps base sequence $X_0, X_1, \ldots, X_{47}$ to the RS subcarriers in the PRBs of all RS symbols. To be more specific, $X_0, X_1, \ldots, X_{11}$ are mapped to the last symbol in the PUCCH, $X_{12}, X_{13}, \ldots, X_{23}$ are mapped to the RS symbol that is four symbols before that, $X_{24}, X_{25}, \ldots, X_{35}$ are mapped to the RS symbol that is eight symbols before the last symbol, and $X_{36}, X_{37}, \ldots, X_{47}$ are mapped to the RS symbol that is twelve symbols before the last symbol. Note that the order of mapping of base sequences is by no means limited to this.

Figure 4A:
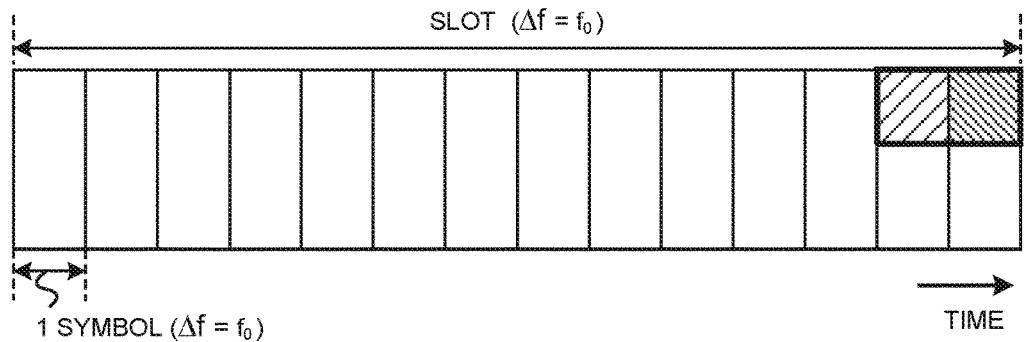
FIG. 4A to FIG. 4D provide diagrams, each showing an example of a PUCCH format according to a first embodiment of the present invention.
Figure 4B:
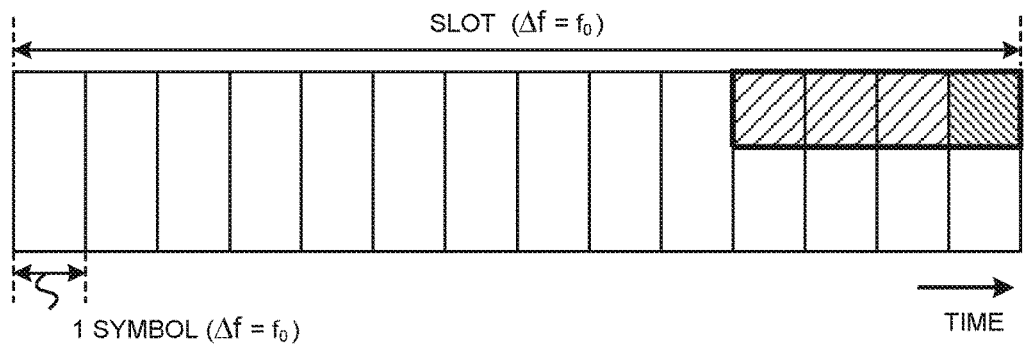
Figure 4C:
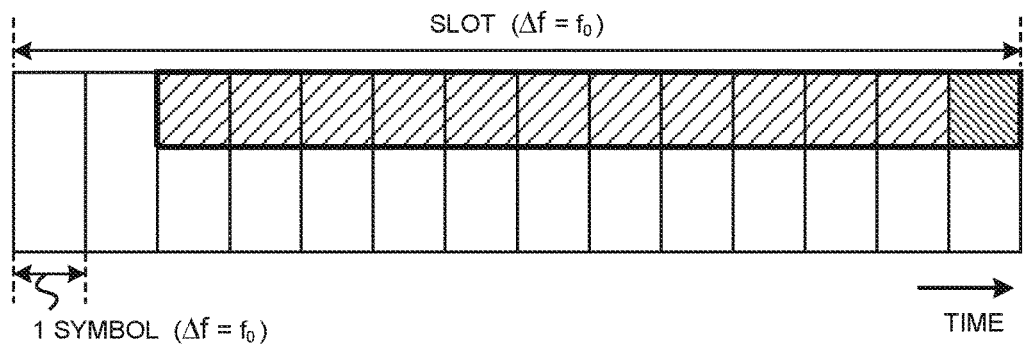
Figure 4D:
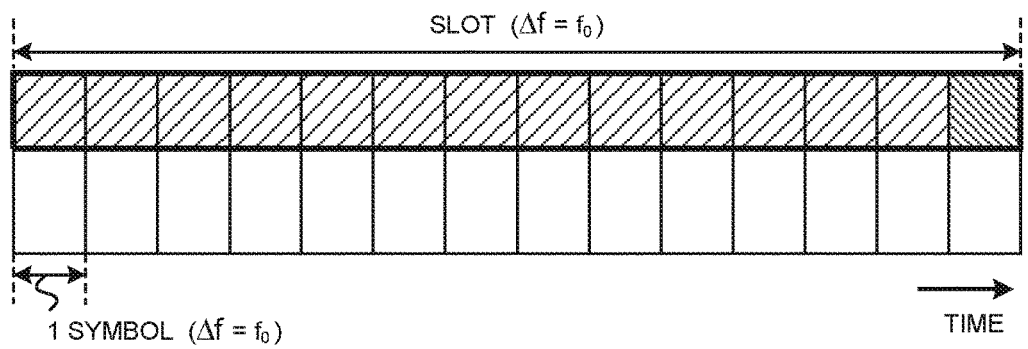
Figure 18:
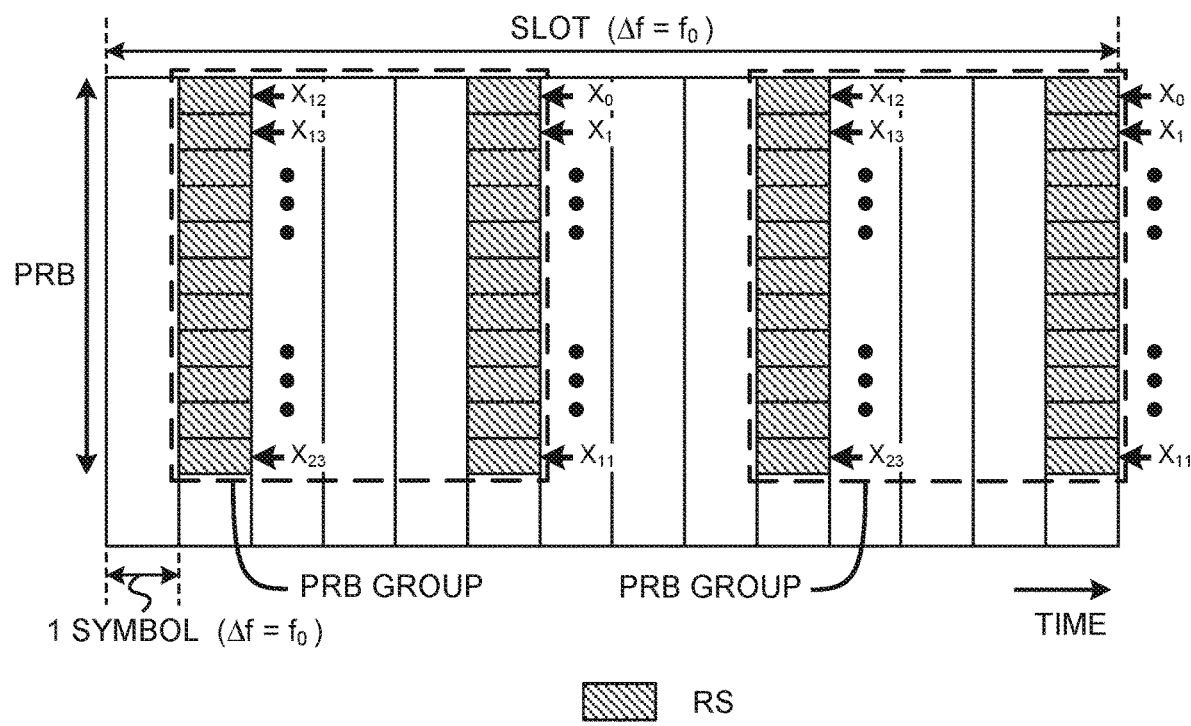
FIG. 18 is a diagram to show an example of resource mapping when RS base sequences are allocated in PRB groups.

FIG. 18 is a diagram to show an example of resource mapping when RS base sequences are allocated within a PRB group. In this example, RS resource mapping assuming the PUCCH format (RS format) of FIG. 4D is shown. In this case, m=12 and K=2. The UE generates base sequences $X_0, X_1, \ldots, X_{23}$ (sequence length=24), and maps base sequences of $X_0, X_1, \ldots, X_{23}$ to the RS subcarriers in the PRB group. In this example, it is assumed that a PRB group is comprised of two RS symbols (two PRBs). The RS symbol being the last symbol of the PUCCH and the RS symbol four symbols before that constitute one PRB group, and the RS symbols eight symbols and twelve symbols before the last symbol constitute another PRB group.

As described above, according to the first embodiment, RSs can be transmitted in the same symbol position even when PUCCHs with different numbers of symbols are used, so that it is possible to prevent the degradation of communication throughput and so on.

Second Embodiment

As for the method of reporting UCI, there are possible methods apart from the method of multiplexing and reporting UCI and the RS (DMRS) that is necessary to demodulate the UCI, as has been described with the first embodiment (which may be referred to as "coherent transmission," "coherent design" and so on).

With a second embodiment, multiplexing of a PUCCH for coherent transmission and other signals will be described. This multiplexing makes possible more flexible resource allocation, and can improve the efficiency of the use of resources.

Multiplexing with Non-Coherent UCI Report

As the method of reporting UCI, a method of reporting UCI in transmission signals not including DMRSs is under study (which may be referred to as "non-coherent transmission," "non-coherent design" and so on). UCI that is reported via non-coherent transmission (UCI based on non-coherent transmission) is detected by the network without requiring DMRSs, and therefore may be referred to as "RS that does not require UCI ("RS w/o UCI")," and/or the like.

In addition, UCI to be reported via non-coherent transmission can also be reported using orthogonal resources that are used to transmit predetermined RSs (for example, the CDM codes applied, the amounts of phase rotation of CAZAC sequences, the time and/or frequency resources, etc.), and may be referred to as "UCI on RS ("RS on UCI")," "UCI-reporting RS," and so on. As described above, non-coherent transmission may be referred to as "sequence-based UCI reporting," because UCI may be identified based on the sequence.

Note that the base sequence for a UCI-reporting RS may be a CAZAC sequence or a sequence conforming to a CAZAC sequence. Information about the base sequence may be reported to the UE via higher layer signaling and/or physical layer signaling. Information about the candidates of orthogonal resources (for example, the amount of phase rotation) to use to generate and/or generate the UCI-reporting RS may be reported to the UE. In this case, the UE may determine the orthogonal resources to use to transmit the UCI from among the reported candidates. For example, the UE may determine the orthogonal resources based on the information of the UCI to be reported (the content of the UCI).

Figure 19:
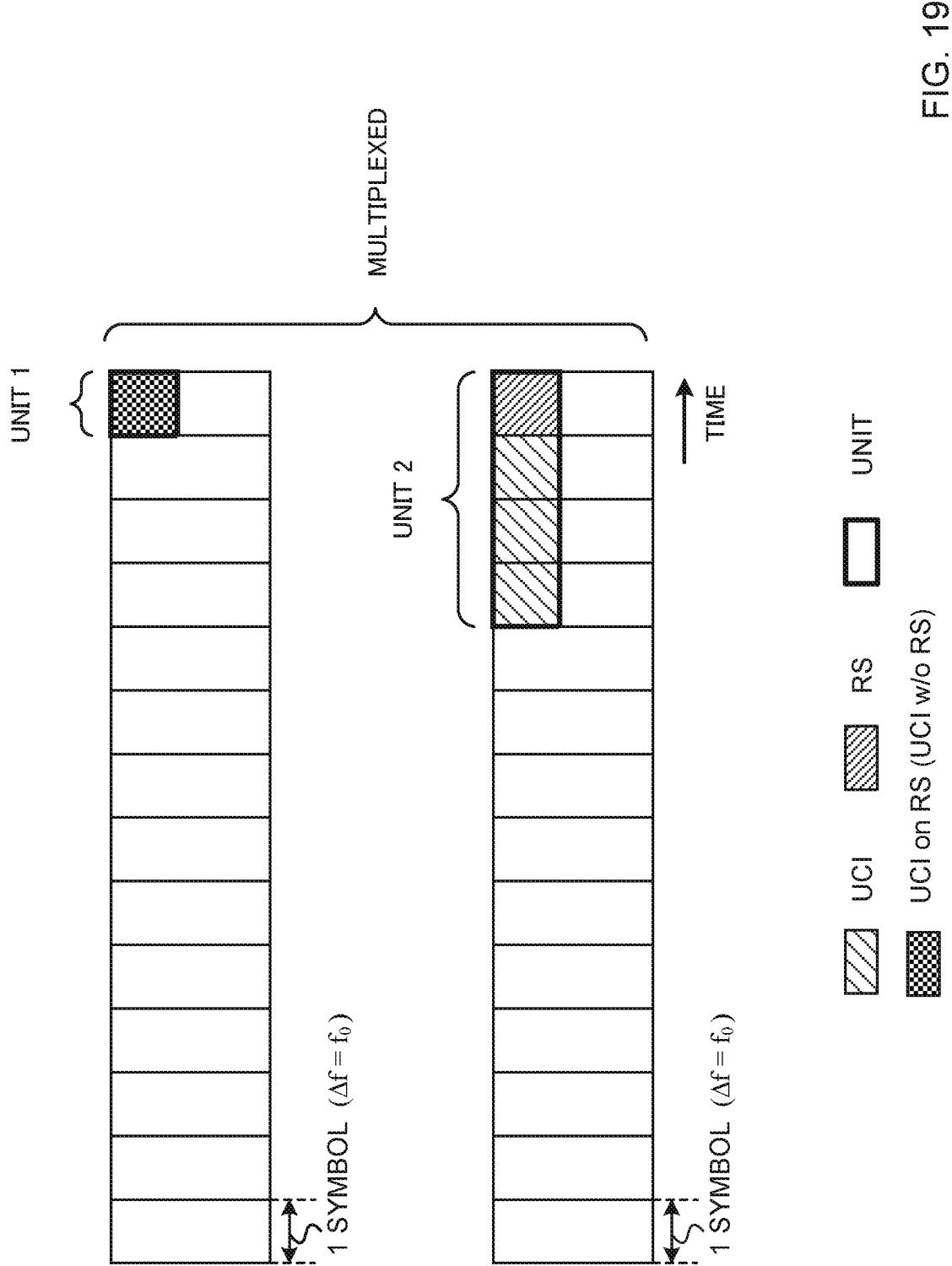
FIG. 19 is a diagram to show an example of multiplexing UCI for coherent transmission and for non-coherent transmission.
Figure 20:
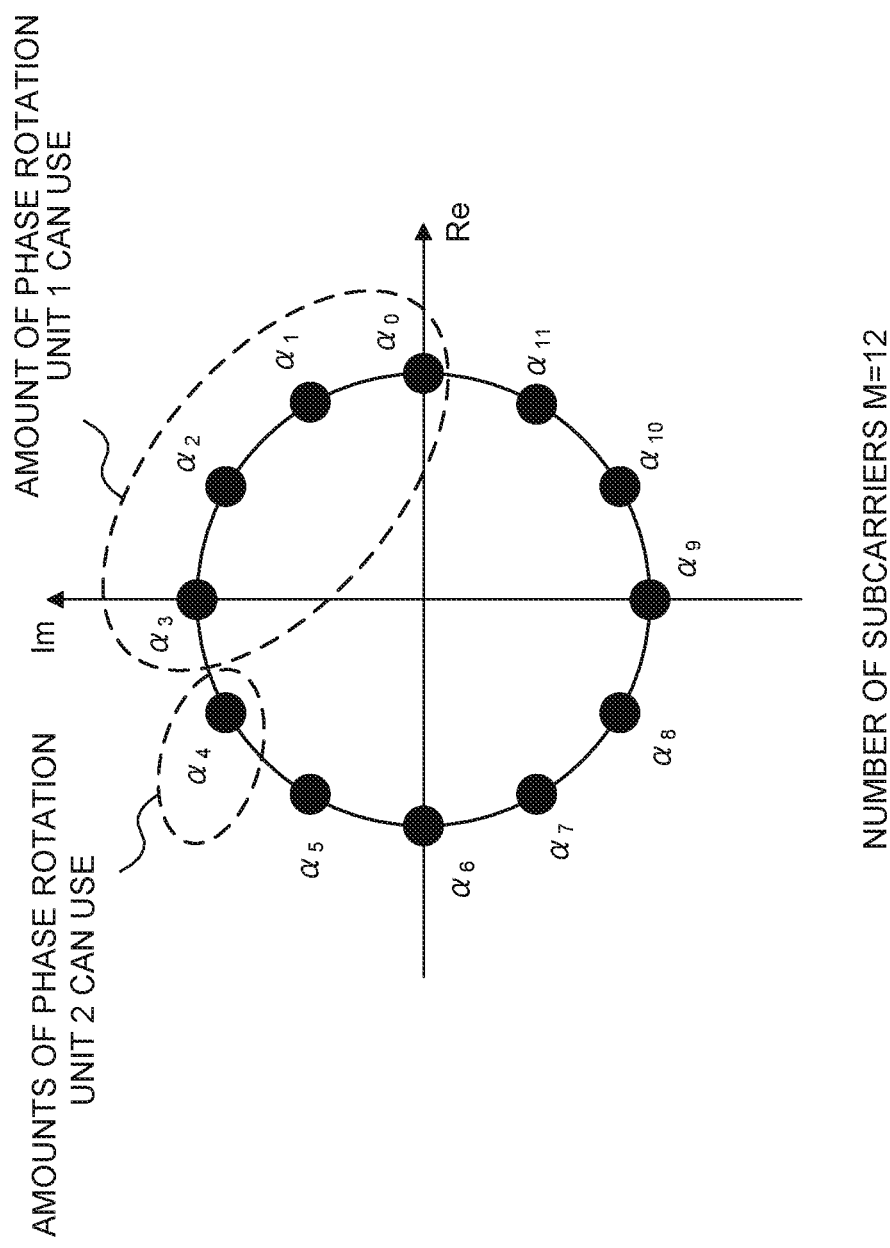
FIG. 20 is a diagram to show an example of a set of amounts of phase rotation.

With reference to FIG. 19 to FIG. 21, the multiplexing of UCIs for coherent transmission and for non-coherent transmission will be described below. The amount of phase rotation in the following description may be replaced with other orthogonal resources (for example, the CDM code).

FIG. 19 is a diagram to show an example of multiplexing of UCIs for coherent transmission and for non-coherent transmission. In this example, unit 1 (for coherent transmission) that is comprised of one symbol and unit 2 (for non-coherent transmission) that is comprised of four symbols are multiplexed with each other. The UCI-reporting RS in unit 1 is mapped to the same symbol as the RS in unit 2.

The UCI-reporting RS in unit 1 and the RS in unit 2 are generated to be sequences that are orthogonal to each other. In this example, these RS sequences are obtained by applying phase rotations of varying phase rotation amounts to base sequences. The set of one or more phase rotation amounts that are available for use by a given unit may be referred to as a "phase rotation amount set."

FIG. 20 is a diagram to show an example of a phase rotation amount set. Although FIG. 20 assumes that the number of subcarriers (M) used to transmit RSs is twelve (that is, one PRB is used to transmit RSs), this is by no means limiting.

The sequence length of base sequences is determined based on the number of subcarriers, M, and the number of PRBs. In this case, one PRB is assumed, so that the sequence length of base sequences is 12 (=12×1). In this case, as shown in FIG. 20, twelve phase rotation amounts $\alpha_0$ to $\alpha_{11}$ that are provided at phase interval of $2\pi/12$ are defined. The twelve sequences obtained by phase-rotating base sequences by phase rotation (cyclic shift) amounts $\alpha_0$ to $\alpha_{11}$ are orthogonal to each other. Note that phase rotation amounts $\alpha_0$ to $\alpha_{11}$ may be defined based on at least one of the number of subcarriers, M, the number of PRBs and the sequence length of base sequences.

The set of phase rotation amounts may be comprised of two or more phase rotation amounts selected from phase rotation amounts $\alpha_0$ to $\alpha_{11}$. For example, referring to FIG. 20, the set of phase rotation amounts to be assigned to unit 1 is configured to include consecutive (adjacent) phase rotation amounts $\alpha_0$ to $\alpha_3$ amongst phase rotation amounts $\alpha_0$ to $\alpha_{11}$. The number of phase rotation amounts to be included in this set of the phase rotation amount is not limited to three.

Here, the amounts of phase rotation used to generate the UCI-reporting RSs are each associated with a different piece of information that is intended to be reported in each UCI. For example, in the case of FIG. 20, phase rotation amounts $\alpha_0$ to $\alpha_3$ that apply to the UCI-reporting RS of unit 1 may be associated with different pieces of information (for example, information 0 to 3). That is, the UE can report two bits of UCI by transmitting a UCI-reporting RS, to which one amount of phase rotation that is selected from $\alpha_0$ to $\alpha_3$ is applied.

On the other hand, the RS of unit 2 is selected from phase rotation amounts apart from the set of phase rotation amounts assigned to unit 1. In the case of FIG. 20, the RS of unit 2 is applied $\alpha_4$ and transmitted.

FIG. 21A to FIG. 21D provide diagrams, each showing an example of the process of generating the UCI-reporting RS of unit 1 in FIG. 20. In the process of generating RSs, the UE applies phase rotation to base sequences $X_0$ to $X_{M-1}$ of the sequence length M by selected phase rotation amounts $\alpha$, and inputs the phase-rotated base sequences to an OFDM transmitter or a DFT-S-OFDM transmitter. The UE transmits output signals from the OFDM transmitter or the DFT-S-OFDM transmitter.

Figure 21B:
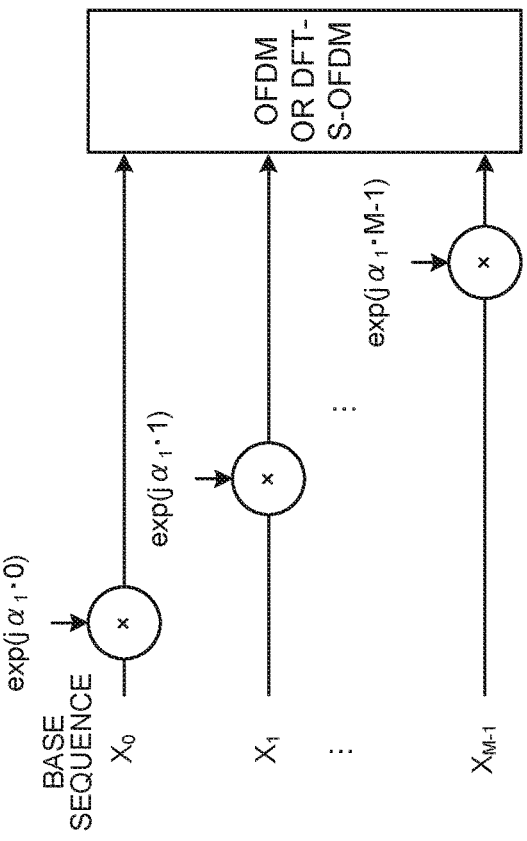
FIG. 21A to FIG. 21D provide diagrams, each showing an example of a process of generating a UCI-reporting RS of unit 1 in FIG. 20.
Figure 21D:
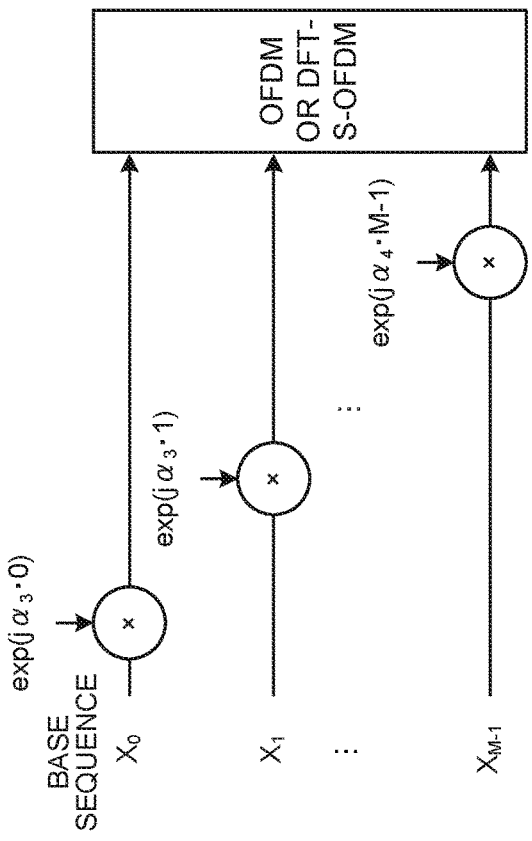
Figure 21A:
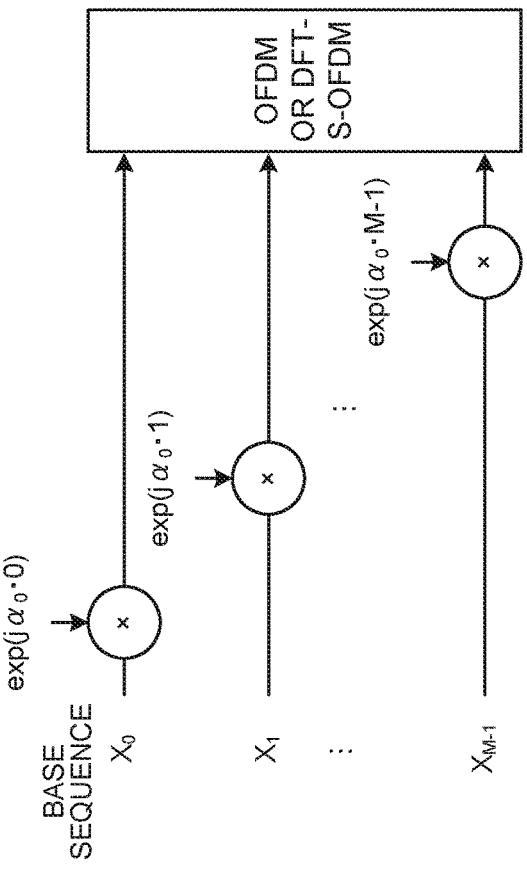
Figure 21C:
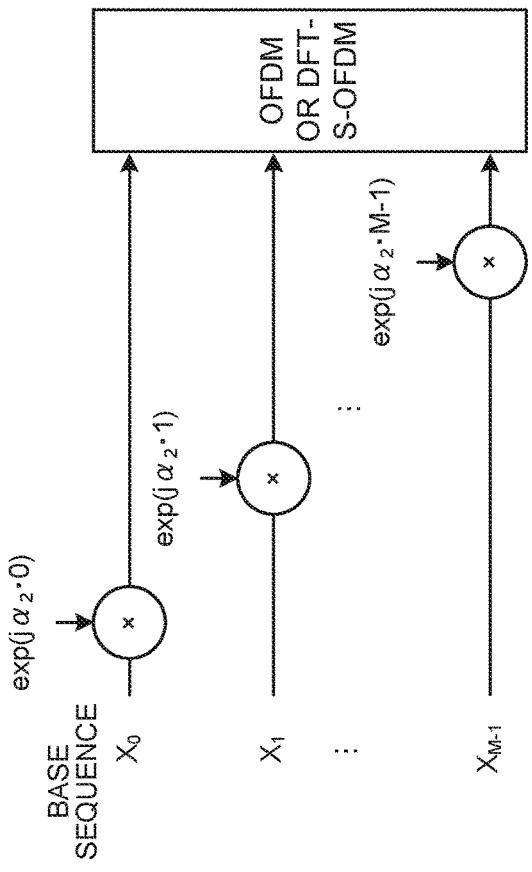

When the UE reports information 0 as UCI, the UE applies phase rotation to base sequences $X_0$ to $X_{M-1}$ using phase rotation amount $\alpha_0$ that is associated with information 0, as shown in FIG. 21A. Similarly, when the UE reports information 1 to 3 as UCI, the UE applies phase rotation to base sequences $X_0$ to $X_{M-1}$ using phase rotation amounts $\alpha_1$, $\alpha_2$ and $\alpha_3$, which are associated with information 1 to 3, as shown in FIGS. 21B, 21C and 21D, respectively.

Figure 22:
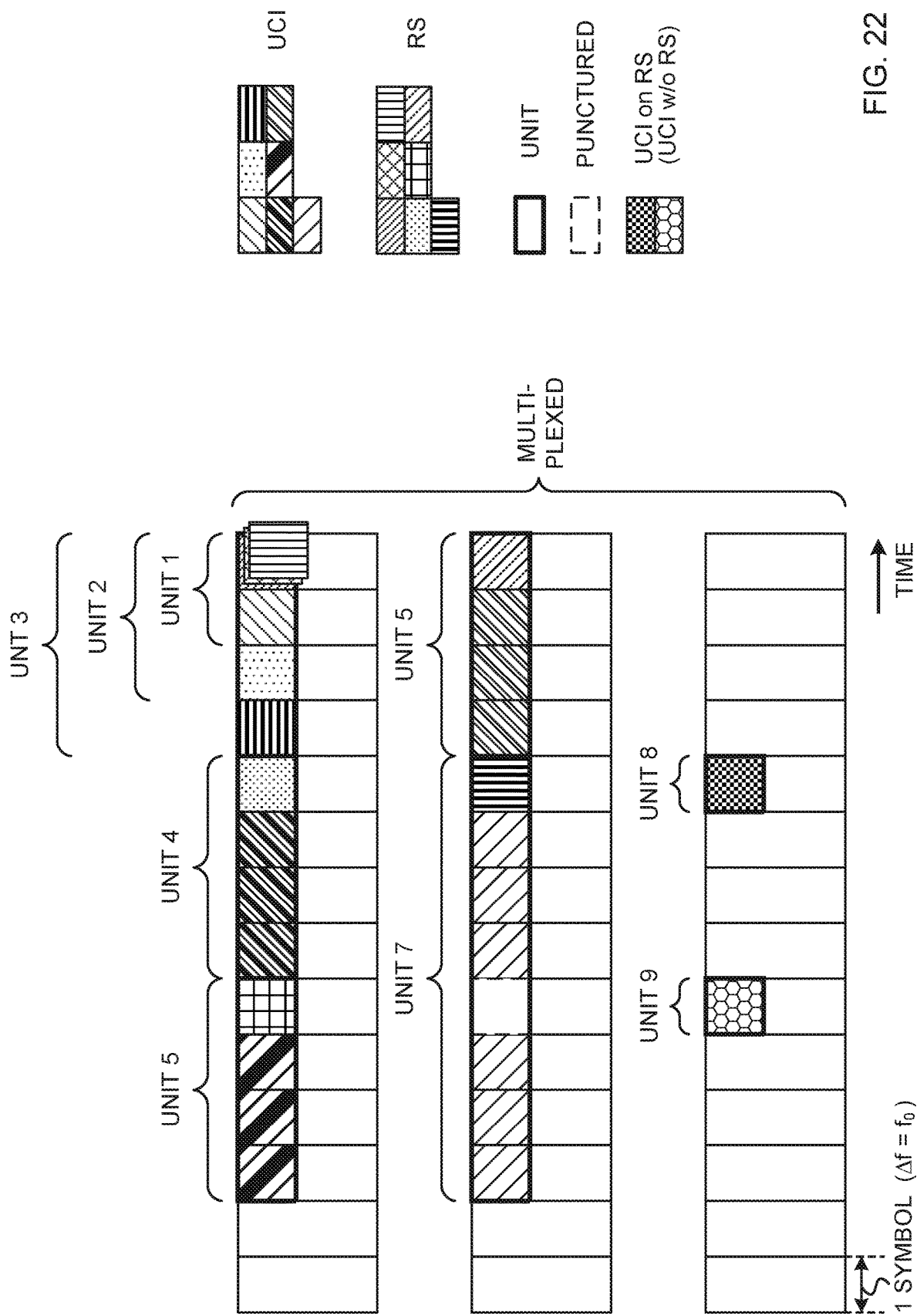
FIG. 22 is a diagram to show another example of multiplexing UCIs for coherent transmission and for non-coherent transmission.

FIG. 22 is a diagram to show another example of multiplexing UCIs for coherent transmission and for non-coherent transmission. In this example, units 1 to 3, comprised of two symbols, are multiplexed with each other, and furthermore multiplexed with unit 6 that is comprised of four symbols. Also, units 4 and 5, composed of four symbols, are multiplexed with unit 7, comprised of eight symbols.

Also, the RSs of units 4 and 7 are multiplexed with unit 8, which is comprised of one symbol. Then, the RS in unit 5 is multiplexed with unit 9. A part of the UCI of unit 7 is padded so as to suppress interference with the RSs of units 5 and 9. Units 1 to 7 are PUCCHs that contain UCIs and RSs (for coherent transmission), and units 8 and 9 are UCI-reporting RSs (for non-coherent transmission).

In resources where a plurality of PUCCHs carrying a small number of symbols are multiplexed (for example, the resources in FIG. 22 where units 1 to 3 and unit 6 are multiplexed), many code fields are used to multiplex RSs of multiple UEs (units), so that it is likely that few code fields are left for UCI-reporting RSs. Consequently, it is difficult to map UCI-reporting RSs to such resources.

On the other hand, in resources where PUCCHs with a large number of symbols are multiplexed (for example, the resources in FIG. 22 where units 4 or 5 and unit 7 are multiplexed), it is not likely that many code fields used to multiplex RSs of multiple UEs (units), so that it is likely that a relatively large number of code fields are left for UCI-reporting RSs. Consequently, there is a high possibility that UCI-reporting RSs are mapped to such resources.

Multiplexing with Measurement Reference Signals (SRSs: Sounding Reference Signals)

UCI for coherent transmission and an SRS may be multiplexed. This SRS may be an RS for reporting UCI such as described above, and, in this case, this SRS may be referred to as a "UCI-reporting SRS," "UCI on SRS ("SRS on UCI")" and so on. The UCI-reporting SRS may be a sequence-based signal as described above. Also, this SRS may be a normal SRS not multiplexed with UCI.

Figure 23:
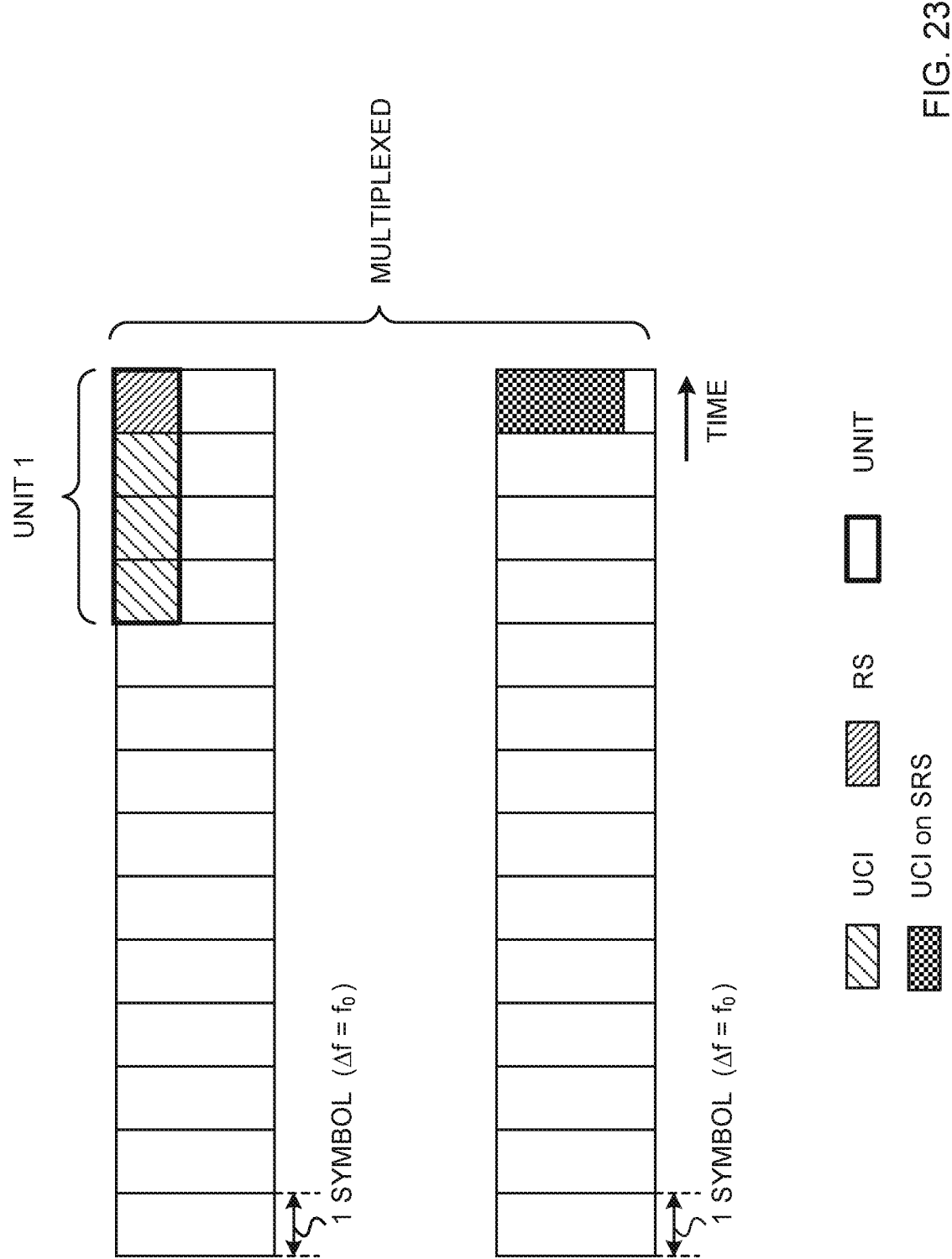
FIG. 23 is a diagram to show an example of multiplexing a PUCCH for coherent transmission and a UCI-reporting SRS.
Figure 24:
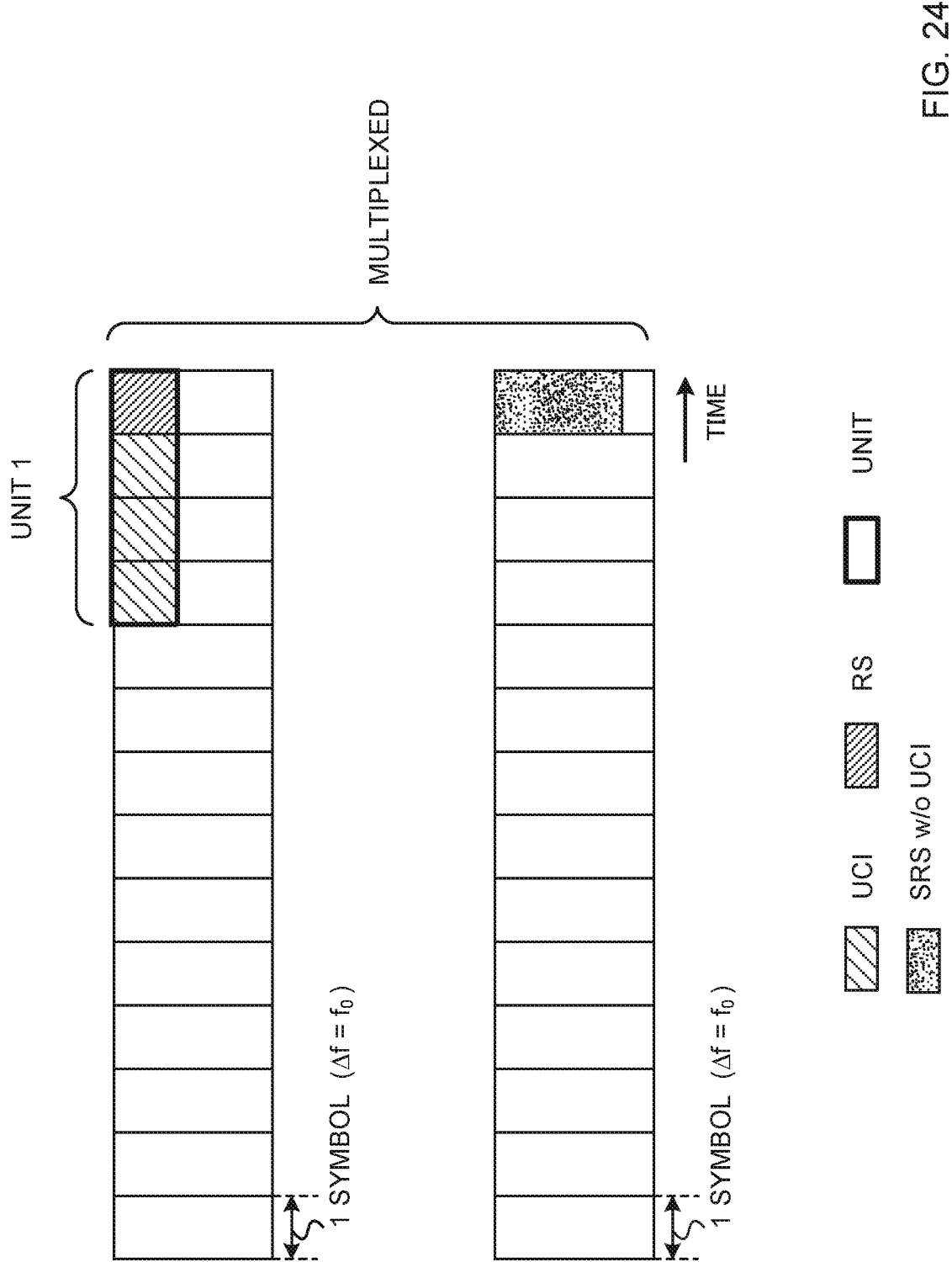
FIG. 24 is a diagram to show an example of multiplexing a PUCCH for coherent transmission and an SRS in which UCI is not multiplexed.

FIG. 23 is a diagram to show an example in which a PUCCH for coherent transmission and a UCI-reporting SRS are multiplexed. FIG. 24 is a diagram to show an example in which a PUCCH for coherent transmission and an SRS not multiplexed with UCI are multiplexed. In these examples, the RS of unit 1, comprised of four symbols, is multiplexed with an SRS. The SRS is assumed to be mapped to the last symbol of the slot, and can be multiplexed adequately when the RS included in the PUCCH for coherent transmission is mapped to the last symbol of the PUCCH symbols.

As described above, according to the second embodiment, it is possible to adequately multiplex a PUCCH for coherent transmission with other signals, so that more flexible resource allocation is made possible, and the efficiency of the use of resources can be improved.

Radio Communication System

Now, the structure of a radio communication system according to one embodiment of the present invention will be described below. In this radio communication system, communication is performed using one or a combination of the radio communication methods according to the herein-contained embodiments of the present invention.

Figure 25:
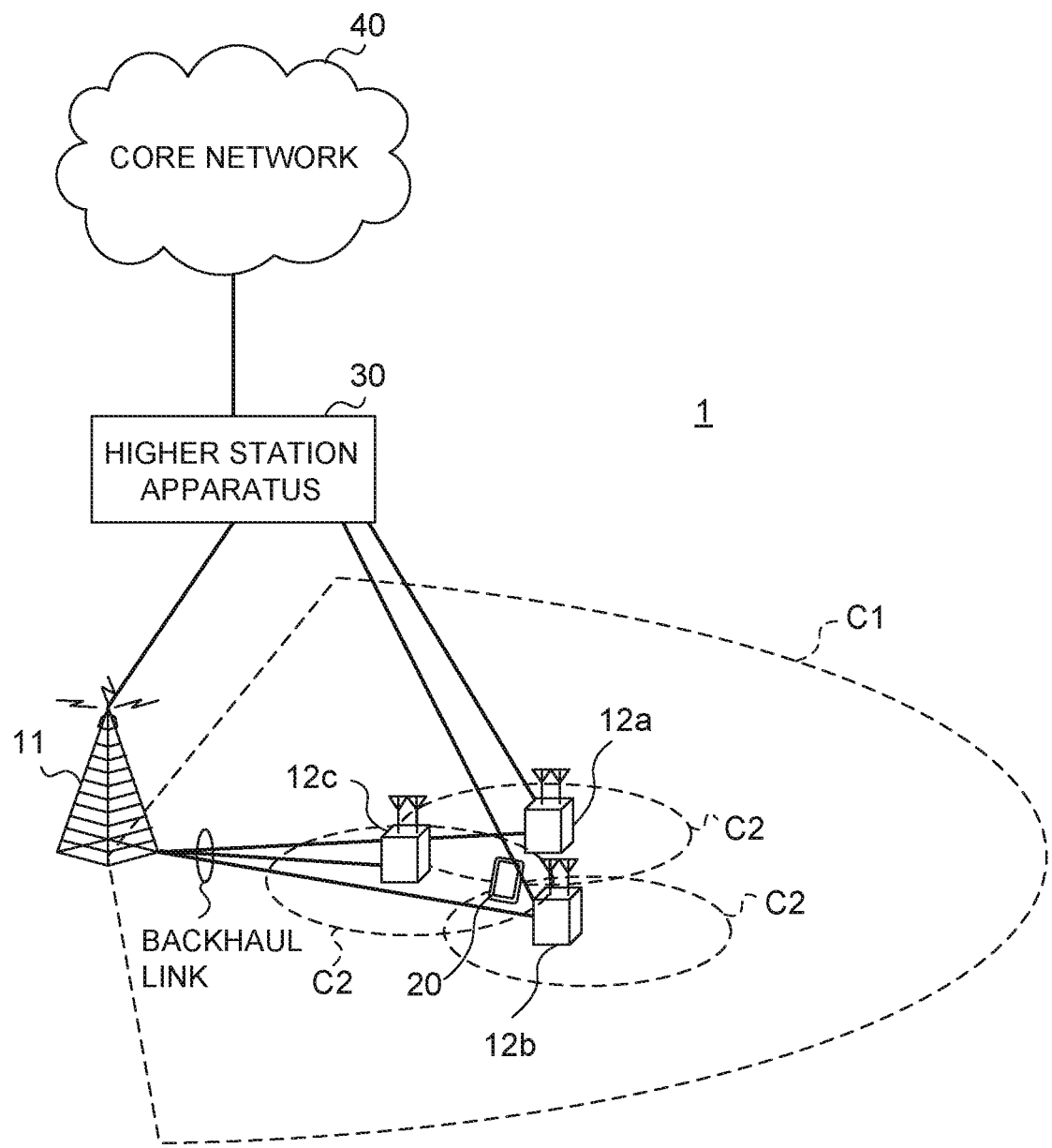
FIG. 25 is a diagram to show an example of a schematic structure of a radio communication system according to one embodiment of the present invention.

FIG. 25 is a diagram to show an example of a schematic structure of a radio communication system according to one embodiment of present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes can be used as well.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBS (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, downlink control information (DCI) and so on, is communicated by the PDCCH.

Note that scheduling information may be reported via DCI. For example, the DCI for scheduling DL data reception may be referred to as "DL Assignment." The DCI to schedule UL data transmission may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, in the PUCCH, downlink radio quality information (CQI: Channel Quality Indicator), delivery acknowledgment information, scheduling requests (SRs) and so on are communicated. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that, DMRSs may be referred to as user terminal-specific reference signals (UE-specific Reference Signals). Also, the reference signals to be communicated are by no means limited to these.

Radio Base Station

Figure 26:
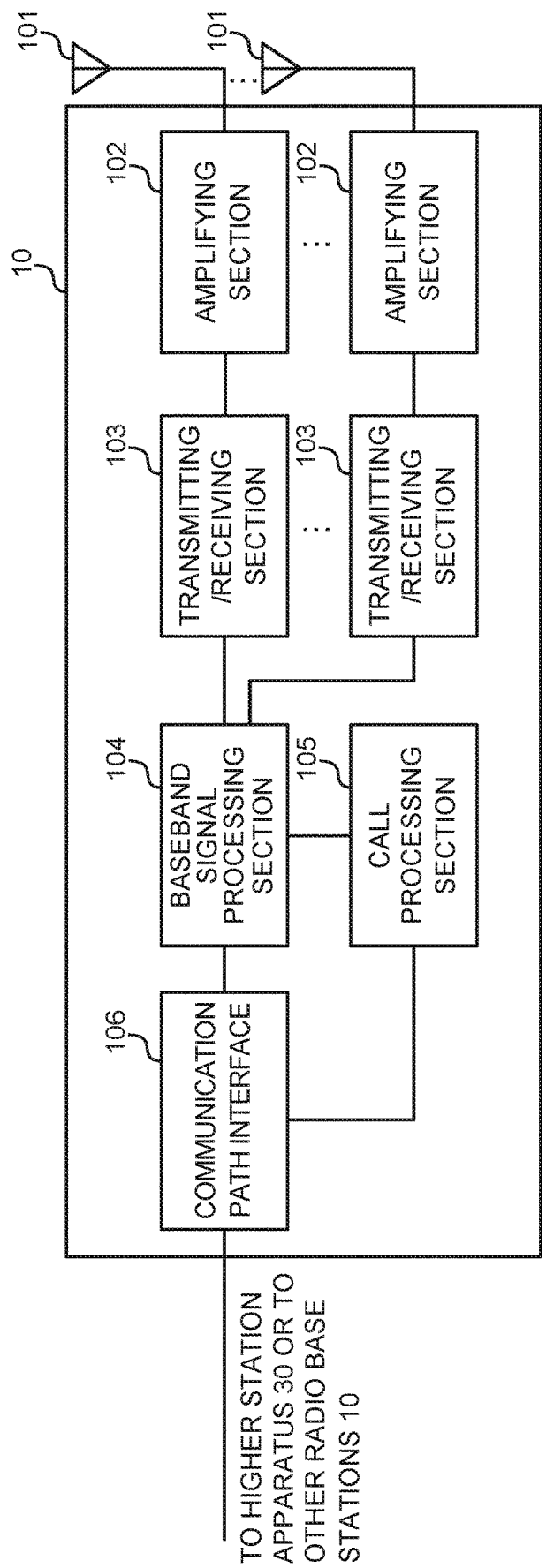
FIG. 26 is a diagram to show an example of an overall structure of a radio base station according to one embodiment of the present invention.

FIG. 26 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive signals using multiple TTIs of different lengths (TTI durations). For example, in one or more carriers (cells, CCs, etc.), the transmitting/receiving sections 103 may receive signals using a first TTI (for example, a long TTI) and a second TTI (for example, a short TTI) with a shorter TTI duration than the first TTI.

For example, the transmitting/receiving sections 103 may receive uplink control information (UCI) from the user terminals 20 using at least one of a plurality of formats for uplink control channels (for example, the PUCCH) with different numbers of symbols. Also, the transmitting/receiving sections 103 may receive uplink control information based on non-coherent transmission (for example, UCI-reporting RSs), measurement reference signals (for example, SRSs) and so on.

Also, the transmitting/receiving sections 103 may transmit, to the user terminals 20, at least one of information about the number of PUCCH symbols, information about the RS mapping positions in PUCCH symbols, information about RS base sequences and/or UCI base sequences and information about the base sequences for UCI-reporting RSs.

Figure 27:
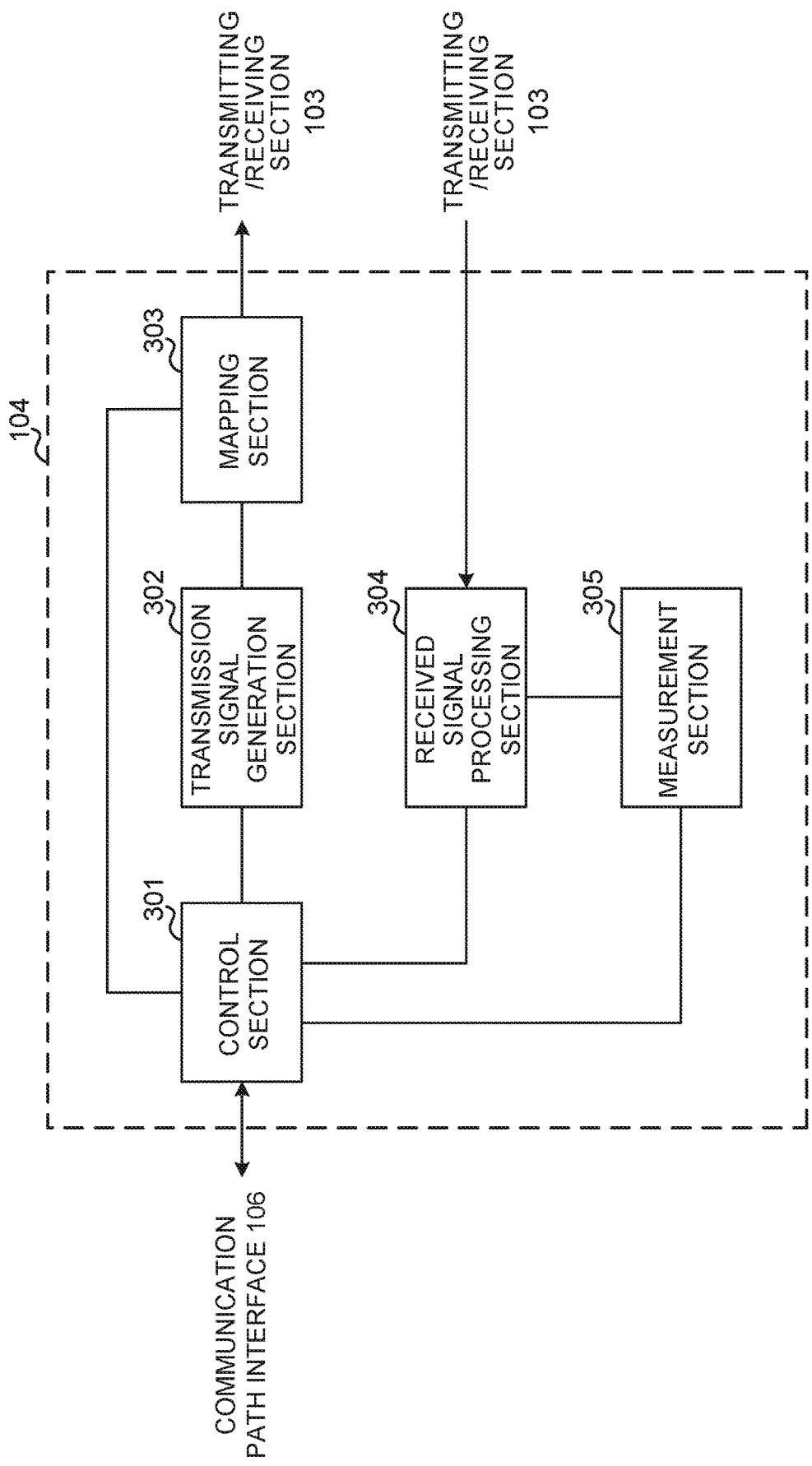
FIG. 27 is a diagram to show an example of a functional structure of a radio base station according to one embodiment of the present invention.

FIG. 27 is a diagram to show an example of a functional structure of a radio base station according to the present embodiment. Note that, although this example will primarily show functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH), downlink control signals (for example, signals transmitted in the PDCCH and/or the EPDCCH, such as acknowledgment information), and so on. The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

In addition, the control section 301 controls scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and so on.

The control section 301 controls the transmission and/or reception of signals in one or more CCs by using a first TTI (for example, a long TTI, a subframe, a slot, etc.) and a second TTI (for example, a short TTI, an sTTI, a minislot, etc.) with a shorter TTI duration than the first TTI.

The control section 301 exerts control so that uplink control information (UCI) is received using at least one of a plurality of uplink control channel (for example, PUCCH) formats carrying different numbers of symbols. The control section 301 may exert control so that, regardless of which of the plurality of uplink control channel formats is used, the receiving process is performed on the assumption that a reference signal (for example, the demodulation reference signal for UCI) is mapped to the same time resources (for example, the same time resources and frequency resources).

For example, the control section 301 may assume that the above reference signal is mapped to a predetermined symbol (for example, the last symbol, the first symbol, etc.) of the uplink control channel. Also, when the number of symbols of the uplink control channel exceeds a predetermined threshold, the control section 301 may assume that the reference signal is mapped to the symbols of every integer multiple of the predetermined threshold, before or after a predetermined reference symbol.

In addition, the control section 301 may generate and transmit information for allowing the user terminals 20 to transmit a plurality of uplink control channels carrying different numbers of symbols and/or to control resource mapping, and allow the user terminals 20 to control these. This information may be reported, for example, via higher layer signaling, DCI, etc.

The control section 301 may assume that the above reference signal (for example, the SRS) is multiplexed with uplink control information based on non-coherent transmission (for example, UCI-reporting RS) and/or a sounding reference signal.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generation apparatus that can be described based on general understanding of the technical field to which the present invention pertains.

For example, the transmission signal generation section 302 generates DL assignments, which report downlink signal allocation information, and. UL grants, which report uplink signal allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) reported from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

User Terminal

Figure 28:
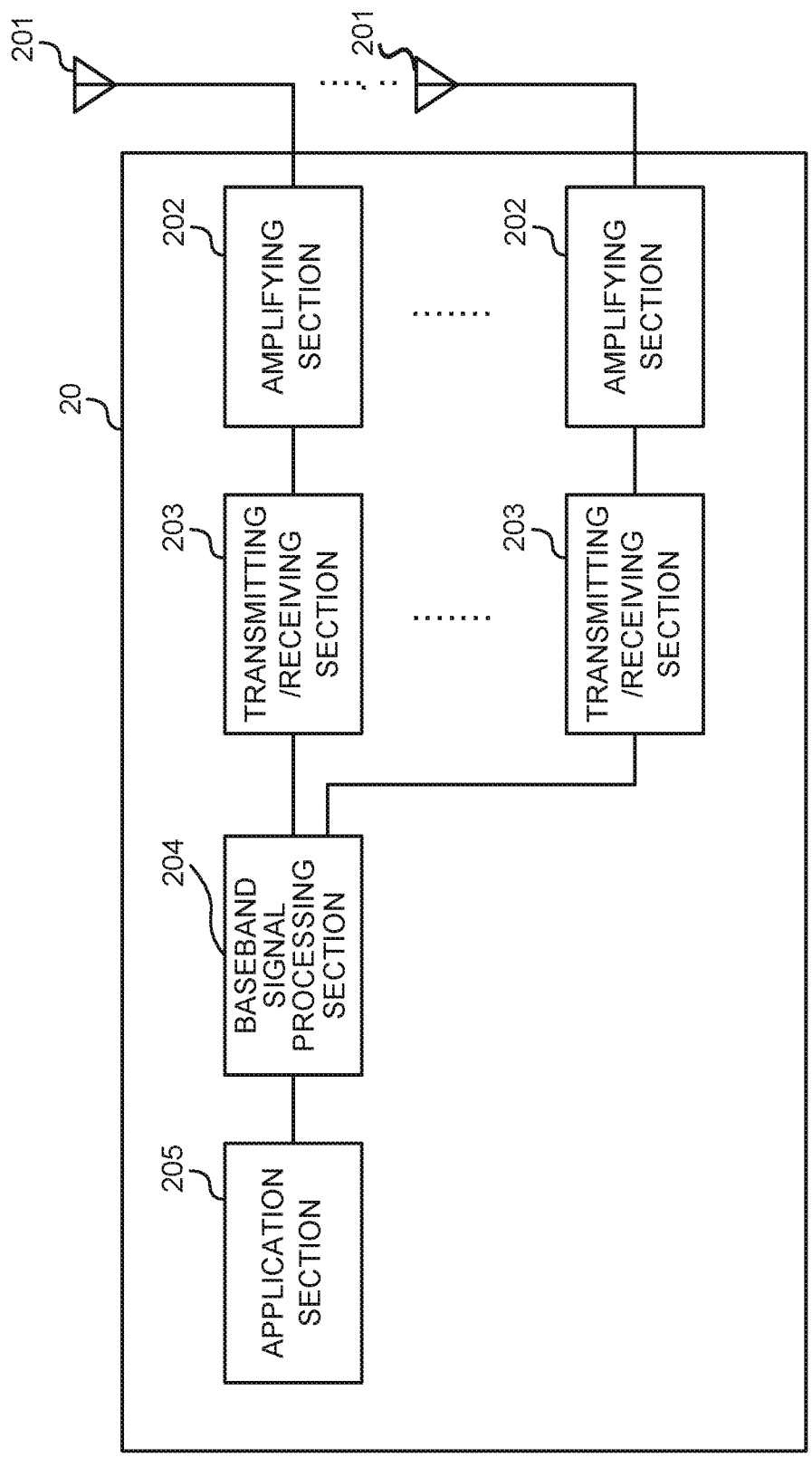
FIG. 28 is a diagram to show an example of an overall structure of a user terminal according to one embodiment of the present invention.

FIG. 28 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit and/or receive signals using multiple TTIs of different lengths (TTI durations). For example, in one or more carriers (cells, CCs, etc.), the transmitting/receiving sections 203 may transmit signals using a first TTI (for example, a long TTI) and a second TTI (for example, a short TTI) with a shorter TTI duration than the first TTI.

For example, the transmitting/receiving sections 203 may transmit uplink control information (UCI) to the radio base station 10 using at least one of a plurality of uplink control channel (for example, PUCCH) formats with different numbers of symbols. Also, the transmitting/receiving sections 203 may transmit uplink control information based on non-coherent transmission (for example, UCI-reporting RS), measurement reference signals (for example, SRSs), and so on.

Also, the transmitting/receiving sections 203 may receive at least one of information about the number of PUCCH symbols, information about the RS mapping positions in PUCCH symbols, information about RS base sequences and/or UCI base sequences, and information about base sequences for UCI reporting RS, from the radio base station 10.

Figure 29:
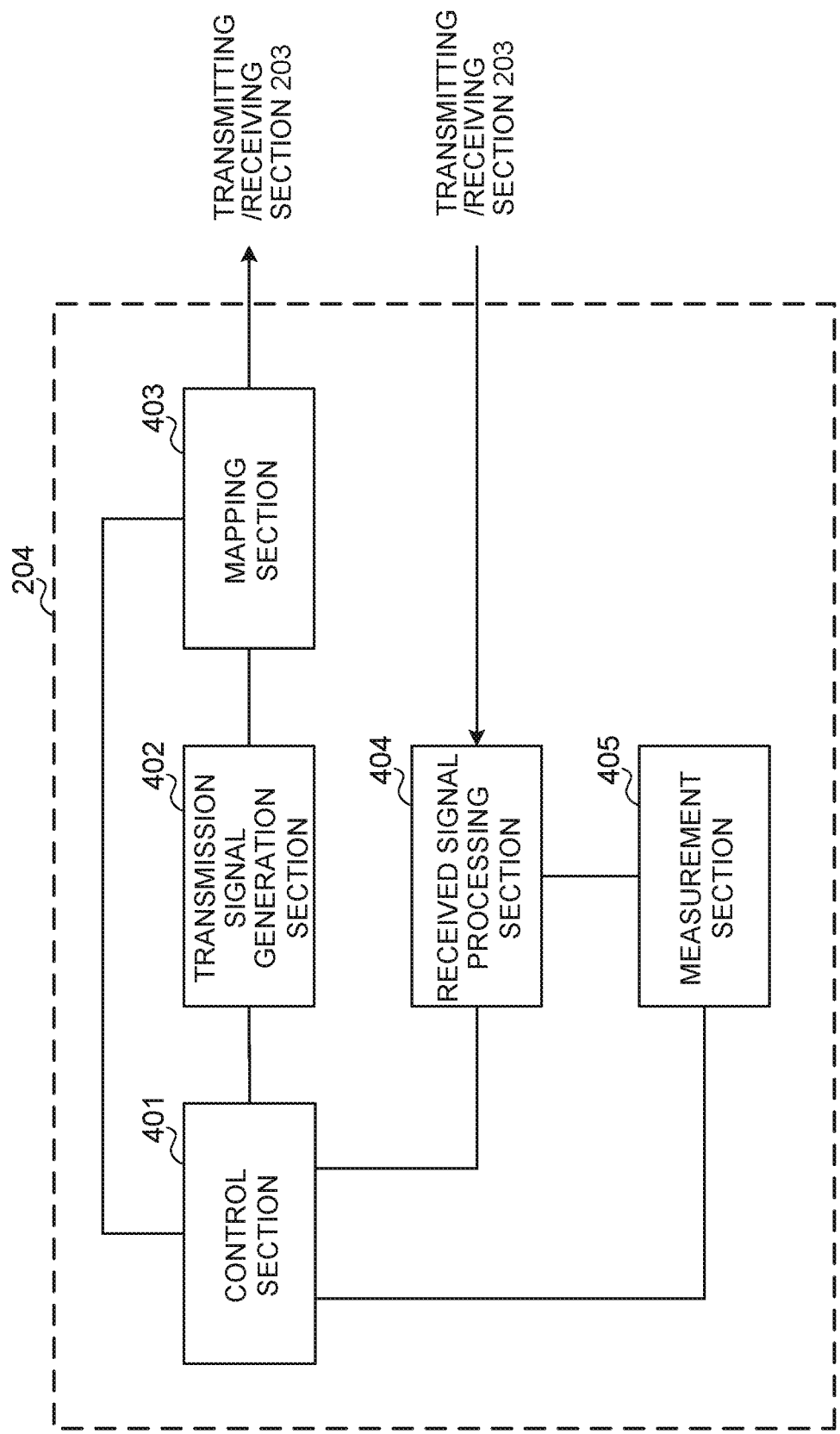
FIG. 29 is a diagram to show an example of a functional structure of a user terminal according to one embodiment of the present invention.
Figure 30:
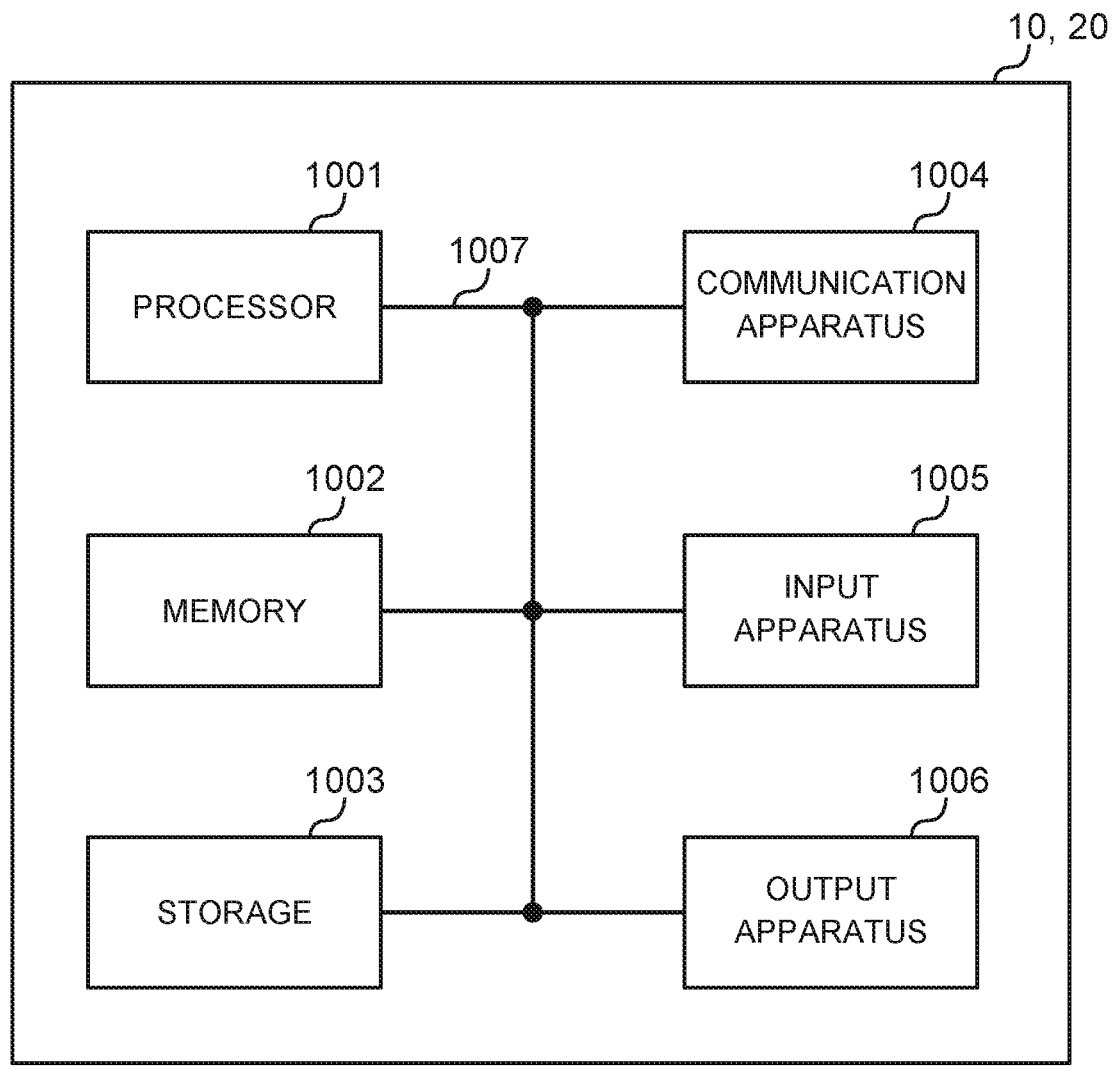
FIG. 30 is a diagram to show an example hardware structure of a radio base station and a user terminal according to one embodiment of the present invention.

FIG. 29 is a diagram to show an example of a functional structure of a user terminal according to the present embodiment. Note that, although this example will primarily show functional blocks that pertain to characteristic parts of the present embodiment, the user terminal 20 has other functional blocks that are necessary for radio communication as well.

The baseband signal processing section 204 provided in the user terminal 20 has a control section 401, a transmission signal generation section 402, a mapping section 403, a received signal processing section 404 and a measurement section 405. Note that these configurations may be included in the user terminal 20, and some or all of the configurations need not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In one or more CCs, the control section 401 controls the transmission and/or reception of signals using a first TTI (for example, a long TTI, a subframe, a slot, etc.) and a second TTI (for example, a short TTI, an sTTI, a minislot, etc.) having a shorter TTI duration than the first TTI.

The control section 401 exerts control so that uplink control information (UCI) is transmitted using at least one of a plurality of uplink control channel (for example, PUCCH) formats carrying different numbers of symbols. The control section 401 may exert control so that, regardless of which of the plurality of uplink control channel formats is used, a reference signal (for example, the demodulation reference signal for UCI) is mapped to the same time resource (for example, the same time resource and frequency resource).

For example, the control section 401 may exert control so that the above reference signal is mapped to a predetermined symbol (for example, the last symbol, the first symbol, etc.) in the uplink control channel. Also, when the number of symbols of the uplink control channel exceeds a predetermined threshold, the control section 401 may assume that the reference signal is mapped to the symbols of every integer multiple of the predetermined threshold, before or after a predetermined reference symbol.

The control section 401 may determine the number of symbols of the uplink control channel based on information about the number of symbols of the uplink control channel.

The control section 401 may control the generation and resource mapping of UCI sequences and reference signal sequences. For example, the control section 401 may exert control so that the sequence length of the base sequence of the above reference signal is calculated based on the resources of a plurality of symbols, and this sequence that is based on the base sequence is allocated (mapped) over the resources of the plurality of symbols.

The control section 401 may multiplex the above reference signal with uplink control information based on non-coherent transmission (for example, UCI-Reporting RS) and/or a measurement reference signal (for example, an SRS).

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

For example, the radio base station, user terminals and so on according to embodiments of the present invention may function as a computer that executes the processes of the radio communication method of the present invention. FIG.

23 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened ITT) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-008949, filed on Jan. 20, 2017, including the specification, drawings and abstract, is incorporated herein by reference in its entirety.

The invention claimed is:

1. A terminal comprising:
a processor that, with regard to an uplink control channel format whose number of symbols exceeds a given value X, maps demodulation reference signals for a physical uplink control channel (PUCCH) to a symbol and every X symbols subsequent to the symbol; and
a transmitter that transmits uplink control information using the PUCCH,
wherein the given value X is a reference signal symbol cycle.

2. The terminal according to claim 1, wherein the processor maps one of the demodulation reference signals to a last symbol of the PUCCH.

3. The terminal according to claim 1, wherein the transmitter repetitively transmits the same uplink control information using a plurality of the PUCCH.

4. The terminal according to claim 1, wherein the processor determines the number of symbols of the uplink control channel based on information about the number of symbols of the PUCCH.

5. A radio communication method in a terminal, comprising:
with regard to an uplink control channel format whose number of symbols exceeds a given value X, mapping demodulation reference signals for a physical uplink control channel (PUCCH) to a symbol and every X symbols subsequent to the symbol; and
transmitting uplink control information using the PUCCH,
wherein the given value X is a reference signal symbol cycle.

6. The terminal according to claim 2, wherein the transmitter repetitively transmits the same uplink control information using a plurality of the PUCCH.

7. The terminal according to claim 2, wherein the processor determines the number of symbols of the uplink control channel based on information about the number of symbols of the PUCCH.

8. The terminal according to claim 3, wherein the processor determines the number of symbols of the uplink control channel based on information about the number of symbols of the PUCCH.

9. The terminal according to claim 1, wherein the demodulation reference signals are mapped to a same symbol to a signal sequence where an orthogonal resource associated with uplink control information is applied.

10. The terminal according to claim 9, wherein a sequence of the demodulation reference signals and the signal sequence where the orthogonal resource is applied are obtained by applying phase rotations of varying phase rotation amounts to base sequences.

11. A base station comprising:
a processor that, with regard to an uplink control channel format whose number of symbols exceeds a given value X, controls to receive demodulation reference signals for a physical uplink control channel (PUCCH) which are mapped to a symbol and every X symbol subsequent to the symbol; and
a receiver that receives uplink control information transmitted by using the PUCCH,
wherein the given value X is a reference signal symbol cycle.

12. A system comprising:
a terminal that comprises:
a first processor that, with regard to an uplink control channel format whose number of symbols exceeds a given value X, maps demodulation reference signals for a physical uplink control channel (PUCCH) to a symbol and every X symbols subsequent to the symbol; and
a transmitter that transmits uplink control information using the PUCCH; and
a base station that comprises:
a second processor that controls to receive the demodulation reference signals for the PUCCH; and
a receiver that receives the uplink control information transmitted by using the PUCCH,
wherein the given value X is a reference signal symbol cycle.

* * * * *